(12) United States Patent
Lee

(10) Patent No.: US 9,973,436 B2
(45) Date of Patent: May 15, 2018

(54) SYSTEM, METHOD, AND RECEIVING DEVICE

(71) Applicant: FUJITSU LIMITED, Kawasaki-shi, Kanagawa (JP)

(72) Inventor: Chunghan Lee, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 144 days.

(21) Appl. No.: 15/069,060

(22) Filed: Mar. 14, 2016

(65) Prior Publication Data
US 2016/0323194 A1    Nov. 3, 2016

(30) Foreign Application Priority Data

May 1, 2015 (JP) ................................. 2015-093799

(51) Int. Cl.
| | |
|---|---|
| *H04L 1/00* | (2006.01) |
| *H04L 12/807* | (2013.01) |
| *H04L 12/851* | (2013.01) |
| *H04L 12/721* | (2013.01) |
| *H04L 12/841* | (2013.01) |

(52) U.S. Cl.
CPC ............. *H04L 47/27* (2013.01); *H04L 45/38* (2013.01); *H04L 47/2483* (2013.01); *H04L 47/283* (2013.01)

(58) Field of Classification Search
None
See application file for complete search history.

(56) References Cited

U.S. PATENT DOCUMENTS

| | | | |
|---|---|---|---|
| 2006/0218264 A1* | 9/2006 | Ogawa | H04L 47/10 709/223 |
| 2007/0177502 A1* | 8/2007 | Hama | H04L 1/1628 370/229 |

(Continued)

FOREIGN PATENT DOCUMENTS

| | | |
|---|---|---|
| JP | 2001-195326 | 7/2001 |
| JP | 2003-32295 | 1/2003 |
| JP | 2011-176540 | 9/2011 |

OTHER PUBLICATIONS

Wu, Haitao et al., "ICTCP: Incast Congestion Control for TCP in Data Center Networks", *ACM CoNEXT 2010*, Nov. 30-Dec. 3, 2010, Philadelphia, USA.

*Primary Examiner* — Phirin Sam
(74) *Attorney, Agent, or Firm* — Staas & Halsey LLP

(57) ABSTRACT

A system includes: a transmitting device, switch devices, receiving devices, and a control device. Each of the receiving devices carries out a process including monitoring increase in size of a congestion window which the transmitting device includes, measuring a round trip time, calculating a minimum throughput in one or more target flows whose volume is not smaller than a given size among flows whose packets are received when the increase in the size of the congestion window becomes a steady state, creating a setting window size that is a receive window size for setting on a basis of an already-set window size that is size of a receive window set in a past response packet and a calculated window size that is size of a receive window calculated from the minimum throughput, and transmitting a response packet in which the setting window size is set to the transmitting device.

16 Claims, 35 Drawing Sheets

(56) References Cited

U.S. PATENT DOCUMENTS

| | | | |
|---|---|---|---|
| 2009/0222555 A1* | 9/2009 | Qian | H04L 41/5003 |
| | | | 709/224 |
| 2009/0300211 A1* | 12/2009 | Gallagher | H04L 47/10 |
| | | | 709/235 |
| 2012/0320829 A1 | 12/2012 | Onishi | |
| 2014/0105019 A1* | 4/2014 | Harrang | H04L 43/0888 |
| | | | 370/235 |
| 2014/0153574 A1* | 6/2014 | Louzoun | H04L 1/188 |
| | | | 370/392 |
| 2014/0286258 A1* | 9/2014 | Chowdhury | H04L 1/1812 |
| | | | 370/329 |
| 2014/0289381 A1* | 9/2014 | Morton | H04L 41/5025 |
| | | | 709/221 |
| 2015/0156129 A1* | 6/2015 | Tsuruoka | H04L 47/193 |
| | | | 370/235 |
| 2015/0381753 A1* | 12/2015 | Morton | H04L 41/5025 |
| | | | 709/220 |
| 2017/0163757 A1* | 6/2017 | Morton | H04L 67/2823 |

* cited by examiner

FIG. 5

| INDEX | 5 TUPLES | THE NUMBER OF PREVIOUS PACKETS | THE NUMBER OF PRESENT PACKETS | RTT | INITIAL ACK |
|---|---|---|---|---|---|

INDEX: ELEPHANT FLOW INDEX
5 TUPLES: TRANSMISSION SOURCE IP, TRANSMISSION DESTINATION IP, TRANSMISSION SOURCE PORT, TRANSMISSION DESTINATION PORT, PROTOCOL
THE NUMBER OF PREVIOUS PACKETS: THE NUMBER OF PACKETS RECEIVED IN PREVIOUS TRANSFER (t - 1)
THE NUMBER OF PRESENT PACKETS: THE NUMBER OF PACKETS RECEIVED IN PRESENT TRANSFER (t)
RTT: RTT BETWEEN ACK ↔ DATA
INITIAL ACK: CLOCK TIME OF FIRST ACK FOR MEASURING RTT

FIG. 9

| INDEX | RTT | ACK TIME | ACK NUMBER | THE NUMBER OF FAILURES |
|---|---|---|---|---|

INDEX: RTT INDEX
RTT: RTT BETWEEN ACK ↔ DATA
ACK TIME: CLOCK TIME WHEN ACK IS TRANSMITTED
ACK NUMBER: ACK SEQUENCE NUMBER + MSS (1500, FOR EXAMPLE)
THE NUMBER OF FAILURES: THE NUMBER OF TIMES OF NON-CORRESPONDENCE
THROUGH COMPARISON BETWEEN ACK NUMBER AND DATA NUMBER

FIG. 11

| INDEX | THE NUMBER OF BYTES | RTT | THROUGHPUT | caIRWIN |
|---|---|---|---|---|

INDEX: ELEPHANT FLOW INDEX
THE NUMBER OF BYTES: THE NUMBER OF BYTES MEASURED IN THROUGHPUT MEASUREMENT SLOT
RTT: AVERAGE RTT BETWEEN ACK ↔ DATA
THROUGHPUT: THROUGHPUT OF ELEPHANT FLOW
caIRWIN: RWIN CALCULATED FROM MINIMUM THROUGHPUT

FIG. 28

| INDEX | 5 TUPLES | PATH | RTT | ABW | THROUGHPUT | RWIN | TOPOLOGY |
|---|---|---|---|---|---|---|---|

INDEX: ELEPHANT FLOW IDENTIFIER
5 TUPLES: 5 TUPLES OF ELEPHANT FLOW
PATH: PATH FROM END TO END THROUGH WHICH ELEPHANT FLOW PASSES
RTT: AVERAGE RTT BETWEEN ACK ↔ DATA
ABW: MINIMUM USABLE BANDWIDTH ON PATH
THROUGHPUT: THROUGHPUT OF ELEPHANT FLOW
RWIN: RWIN CALCULATED ON THE BASIS OF ABW AND THROUGHPUT
TOPOLOGY: DEFINED BY MATRIX

FIG. 30

| TOPOLOGY | SW#00 | ... | SW#yy |
|---|---|---|---|
| SW#00 | – | ... | ○ |
| SW#01 | ○ | ... | ○ |
| ⋮ | ⋮ | | ⋮ |
| SW#xx | ○ | ... | – |

–:LINK DOES NOT EXIST BETWEEN SWITCH DEVICES
○:LINK EXISTS BETWEEN SWITCH DEVICES

SYSTEM, METHOD, AND RECEIVING DEVICE

CROSS-REFERENCE TO RELATED APPLICATION

This application is based upon and claims the benefit of priority of the prior Japanese Patent Application No. 2015-093799, filed on May 1, 2015, the entire contents of which are incorporated herein by reference.

FIELD

The embodiments discussed herein are related to a system, a method, and a receiving device.

BACKGROUND

In recent years, information processing systems constructed by coupling plural information processing devices by plural switch devices have been used in data centers and so forth. FIG. 34 illustrates one example of an information processing system in a data center. In FIG. 34, $S_0$ to $S_n$ denote transmission-side end nodes and $R_0$ to $R_n$ denote reception-side end nodes. The end node is an information processing device for example. The transmission-side end node is an information processing device that transmits packets and the reception-side end node is an information processing device that receives the packets transmitted by the transmission-side end node.

SW#00 to SW#05 are switch devices that construct a network. SW#00 to SW#02 are switch devices coupled to the end nodes and are called leaf switches. On the other hand, SW#03 to SW#05 are switch devices coupled to the leaf switches and are called spine switches. Packets transmitted by the transmission-side end nodes are transmitted to the reception-side end nodes via the leaf switches and the spine switches.

In the information processing system illustrated in FIG. 34, rate control is carried out in order to suppress retransmission of a packet and so forth due to congestion. FIG. 35 is a diagram for explaining the rate control. The rate control includes flow control by the reception-side end node and congestion control by the transmission-side end node.

In the flow control, the reception-side end node explicitly notifies the transmission-side end node of a receive window (RWIN) indicating the number of packets that can be received by the reception-side end node by an acknowledgement (ACK) about each flow. In FIG. 35, regarding flow #1, the RWIN is three packets because two packets are stored in a receiving buffer 89. Furthermore, regarding flow #2, the RWIN is four packets because one packet is stored in the receiving buffer 89. In FIG. 35, the packet is represented as "ptk."

It is possible to calculate a theoretical maximum RWIN for each flow from the throughput or round trip time (RTT) of the network. Although the RWIN is represented by the number of packets here, the RWIN may be represented by a data amount such as the number of bytes because the data amount is obtained by multiplying the number of packets by the packet size.

In the congestion control, the transmission-side end node estimates the state of the network, such as congestion, from packet loss or timeout and controls a congestion window indicating the number of packets transmitted to the reception-side end node about each flow. The reception-side end node is not informed of the congestion window and therefore estimates the congestion window by the number of packets per unit time or the like.

In FIG. 35, the transmission-side end node transmits two packets on the basis of the congestion window regarding flow #1 and transmits three packets on the basis of the congestion window regarding flow #2.

In communications using the transmission control protocol (TCP), the flow control and the congestion control simultaneously work and the number of packets transmitted by the transmission-side end node is determined by the smaller window in the RWIN and the congestion window. In general, RWIN congestion window is satisfied. However, if RWIN<congestion window is satisfied, explicit rate control by the reception-side end node is enabled.

A related art is known in which, if handing down to a second communication system of a lower speed is carried out in response to the lowering of the communication quality in communications using a first communication system, the throughput is improved by reducing a reception widow size notified to the communication counterpart.

Furthermore, a related art is known in which, in the case of transmitting packets from a first transmission section to a second transmission section with larger transmission delay, the lowering of the transmission efficiency due to congestion of the second transmission section is suppressed by increasing or decreasing the maximum amount of data that can be transmitted on the basis of the round trip time of the second transmission section.

Moreover, a related art is known in which the throughput is improved by collecting parameters such as the round trip time, the path maximum transmission unit, and the line speed and calculating the optimum window size of file transfer on the basis of the parameters.

In addition, the following related art is known. For example, the time is divided into two slots. In a first slot, the throughput is estimated. In a second slot, rate adjustment is carried out for each flow on the basis of the ratio between the estimated throughput and an expected throughput of the case in which only the reception side is subject to limitation.

As one example of related arts, Japanese Laid-open Patent Publication No. 2011-176540, Japanese Laid-open Patent Publication No. 2003-32295, Japanese Laid-open Patent Publication No. 2001-195326, and Haitao Wu, Zhenqian Feng, Chuanxiong Guo, Yongguang Zhang, "ICTCP: Incast Congestion Control for TCP in Data Center Networks," ACM CoNEXT 2010, Nov. 30-Dec. 3 2010, Philadelphia, USA are known.

SUMMARY

According to an aspect of the invention, a system includes: a transmitting device; a plurality of switch devices; a plurality of receiving devices configured to receive a packet transmitted from the transmitting device via the plurality of switch devices, each of the plurality of receiving devices including a first processor; and a control device configured to control the transmitting device and the plurality of receiving devices and include a second processor. The first processor of each of the plurality of receiving devices carries out a process including monitoring increase in size of a congestion window which the transmitting device includes, measuring a round trip time, the round trip time being a time from transmission of a response packet to the transmitting device in response to reception of data from the transmitting device to reception of next data transmitted by the transmitting device due to reception of the response packet, calculating a minimum throughput in one or more target flows whose volume is not smaller than a given size among flows whose packets are received when the increase in the size of the congestion window becomes a steady state, creating a setting window size that is a receive window size for setting on a basis of an already-set window size that is size of a receive window set in a past response packet and a calculated window size that is size of a receive window calculated from the minimum throughput, and transmitting a response packet in which the setting window size is set to the transmitting device. And, the second processor is configured to: calculate a control setting window size that is a receive window size for setting by the control device on a basis of an average round trip time of each of the plurality of receiving devices calculated from one or more round trip times measured in each of the plurality of receiving devices, and transmit a control packet in which the control setting window size is set to each of the plurality of receiving devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates one example of items stored by a window table about each elephant flow;

FIG. 9 illustrates one example of items stored by an RTT table about each RTT;

FIG. 11 illustrates one example of items stored by an RWIN table about each elephant flow;

FIG. 28 illustrates one example of items stored by a CTRL_RWIN table about each elephant flow;

FIG. 30 illustrates one example of a matrix;

DESCRIPTION OF EMBODIMENTS

Figure 34:
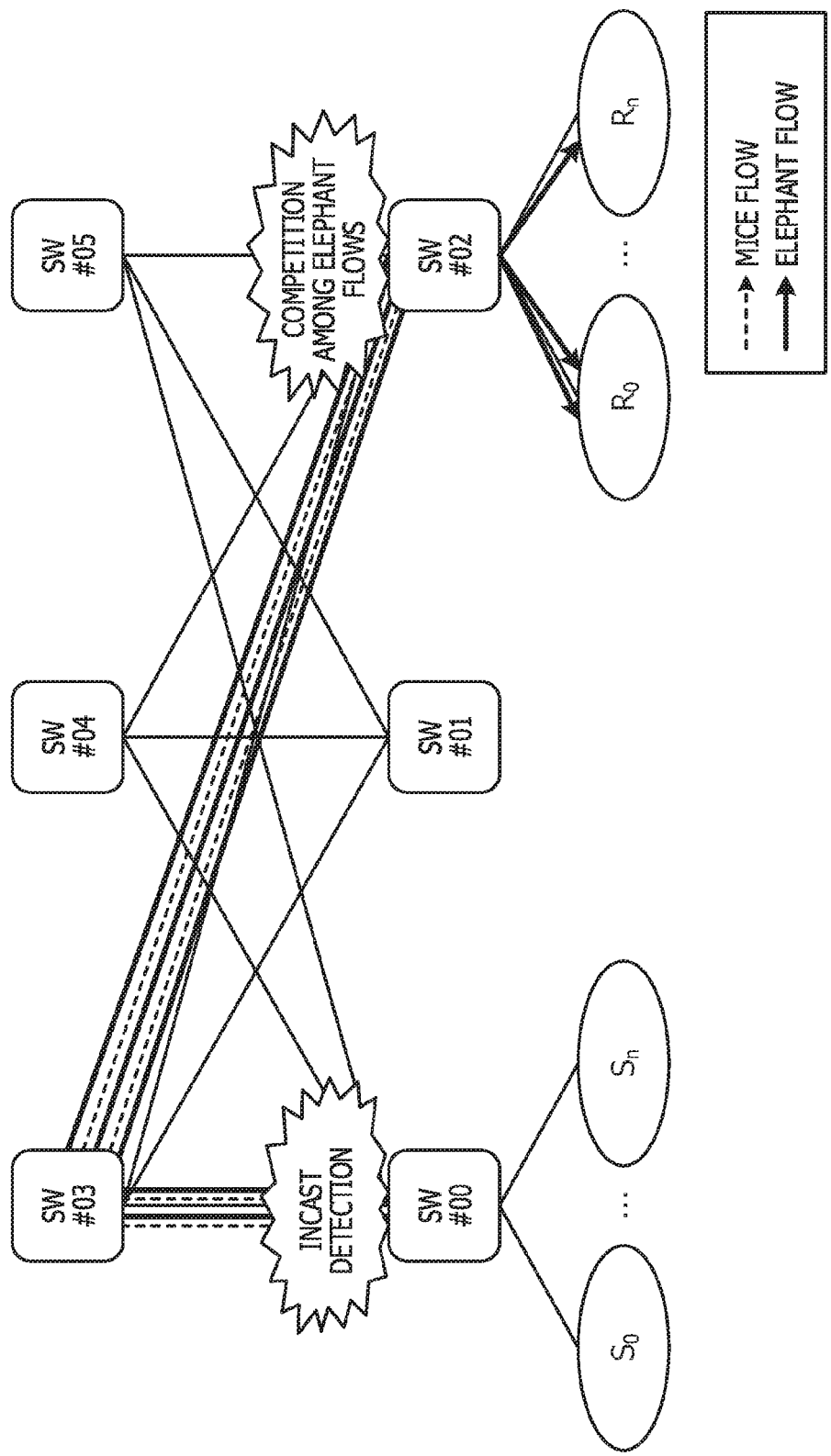
FIG. 34 illustrates one example of an information processing system in a data center.
Figure 35:
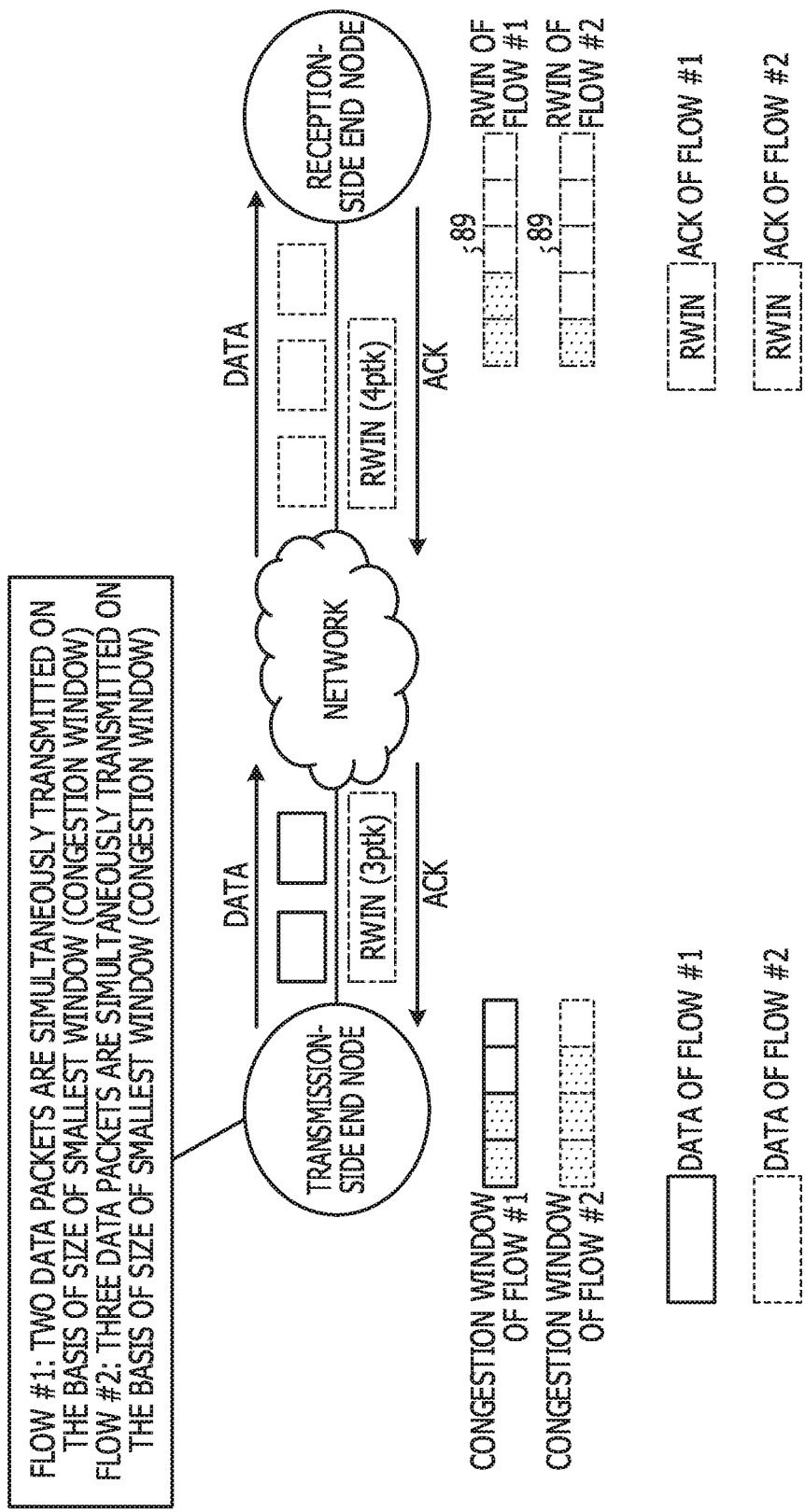
FIG. 35 is a diagram for explaining rate control.

In the information processing system illustrated in FIG. 34, there is a problem that competition among elephant flows occurs among the reception-side end nodes when incast is detected. The incast is congestion that occurs when plural transmission-side end nodes synchronizing in a data center transmit data to a reception-side end node in parallel for example.

Furthermore, the elephant flow is a flow that is sensitive to the throughput and has a long lifetime and a large volume. A flow having a short lifetime and a small volume is called a mice flow. The mice flow is defined as a flow having a volume of 1 M byte or smaller and a lifetime of 10 seconds or shorter for example. In the data center, 90% is the elephant flows and 10% is the mice flows regarding the volume, and 10% is the elephant flows and 90% is the mice flows regarding the number of flows.

In FIG. 34, incast is caused on the transmission side of SW#00, to which n+1 transmission-side end nodes are coupled, and competition among elephant flows is caused on the reception side of SW#02, to which n+1 reception-side end nodes are coupled.

In one aspect, the embodiments intend to suppress the occurrence of competition among elephant flows among reception-side end nodes and efficiently process the elephant flows.

Two embodiments of an information processing system, a control method of an information processing system, and a receiving device disclosed in the present application will be described in detail below on the basis of the drawings. In embodiment 1, rate control in one reception-side end node will be described. In embodiment 2, rate control among plural reception-side end nodes will be described. These embodiments do not limit techniques of the disclosure.

Embodiment 1

First, the configuration of an information processing system according to embodiment 1 will be described. FIG.

Figure 1:
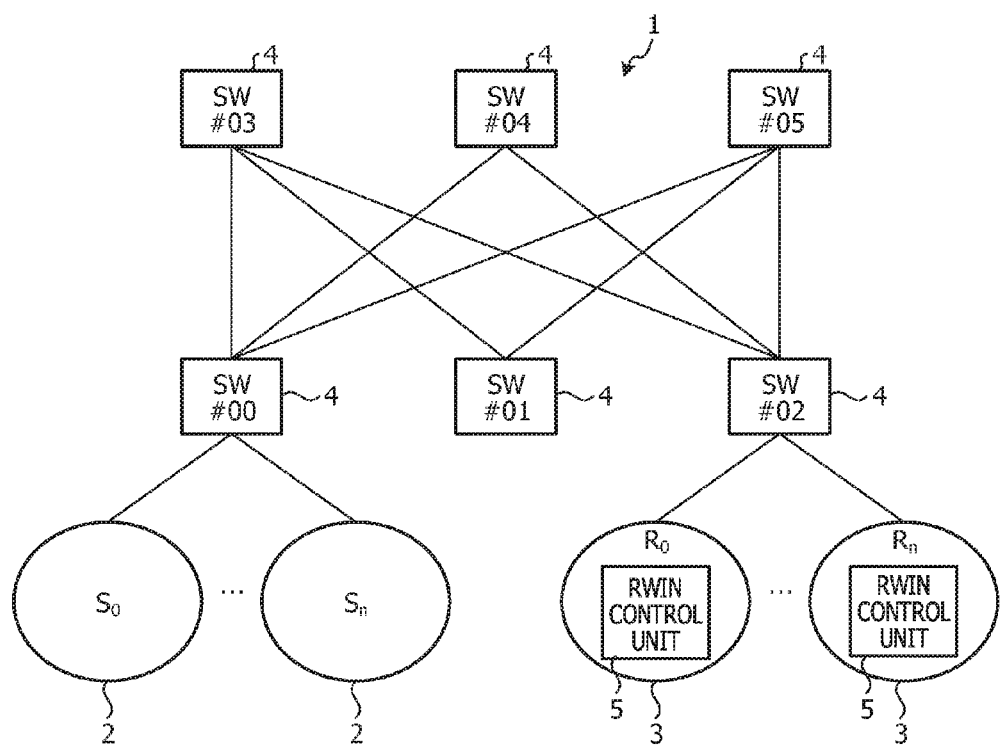
FIG. 1 illustrates a configuration of an information processing system according to embodiment 1.

1 illustrates the configuration of the information processing system according to embodiment 1. As illustrated in FIG. 1, an information processing system 1 includes n+1 transmission-side end nodes 2 represented by $S_0$ to $S_n$, n+1 reception-side end nodes 3 represented by $R_0$ to $R_n$, and six switch devices 4 represented by SW#00 to SW#05. The number of transmission-side end nodes 2 may be different from the number of reception-side end nodes 3. The number of switch devices 4 may be larger or smaller than six.

The transmission-side end nodes 2 are information processing devices and transmit packets to the reception-side end nodes 3 via the switch devices 4. The reception-side end nodes 3 are information processing devices and receive the packets transmitted from the transmission-side end nodes 2 via the switch devices 4. The switch devices 4 are devices that relay the packets.

SW#00, SW#01, and SW#02 are leaf switches and SW#03, SW#04, and SW#05 are spine switches. SW#00 is coupled to $S_0$ to $S_n$ and SW#02 is coupled to $R_0$ to $R_n$. SW#00 to SW#02 are each coupled to SW#03 to SW#05.

Figure 2:
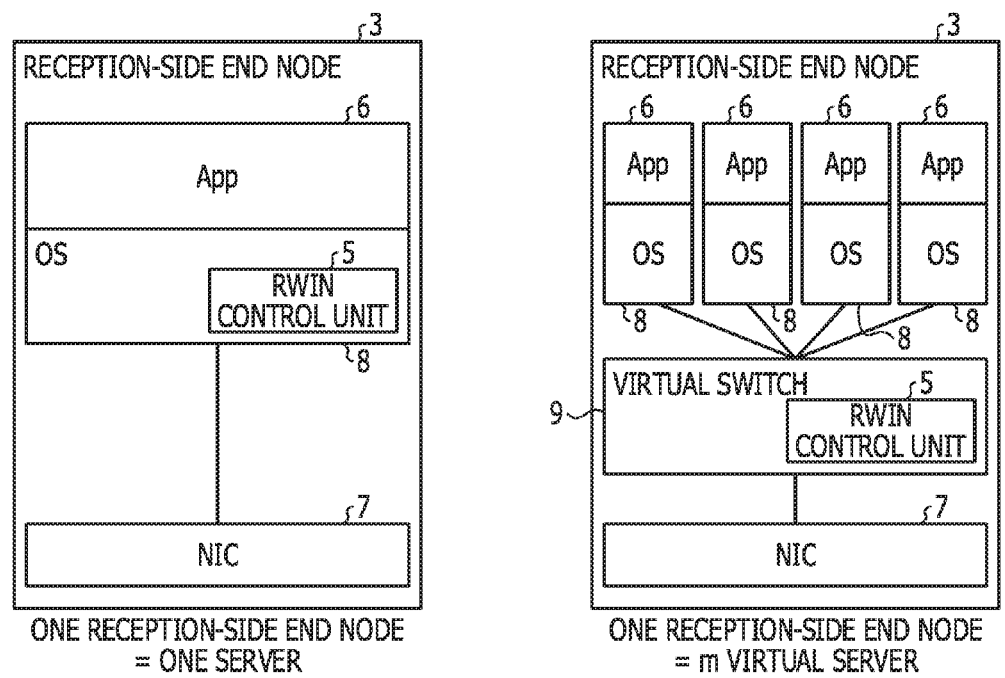
FIG. 2 is a diagram for explaining methods for implementing an RWIN control unit.

The reception-side end node 3 includes an RWIN control unit 5. The RWIN control unit 5 periodically measures the throughput of each elephant flow and controls the RWIN to adjust the rate. FIG. 2 is a diagram for explaining methods for implementing the RWIN control unit 5. FIG. 2 illustrates methods for implementing the RWIN control unit 5 when one reception-side end node 3 operates as one server and when one reception-side end node 3 operates as m virtual servers. In FIG. 2, m=4 is satisfied.

When one reception-side end node 3 operates as one server, the RWIN control unit 5 is implemented by software as part of an operating system (OS) 8. The OS 8 communicates with another device such as the transmission-side end node 2 by using a network interface card (NIC) 7. Furthermore, an application (App) 6 that communicates with an App executed in another device such as the transmission-side end node 2 is executed under control by the OS 8.

When one reception-side end node 3 operates as the m virtual servers, m OSs 8 and a virtual switch 9 that controls the communications of the virtual servers operate in the reception-side end node 3 and the RWIN control unit 5 is implemented by software as part of the virtual switch 9. The virtual switch 9 communicates with another device such as the transmission-side end node 2 by using the NIC 7.

Figure 3:
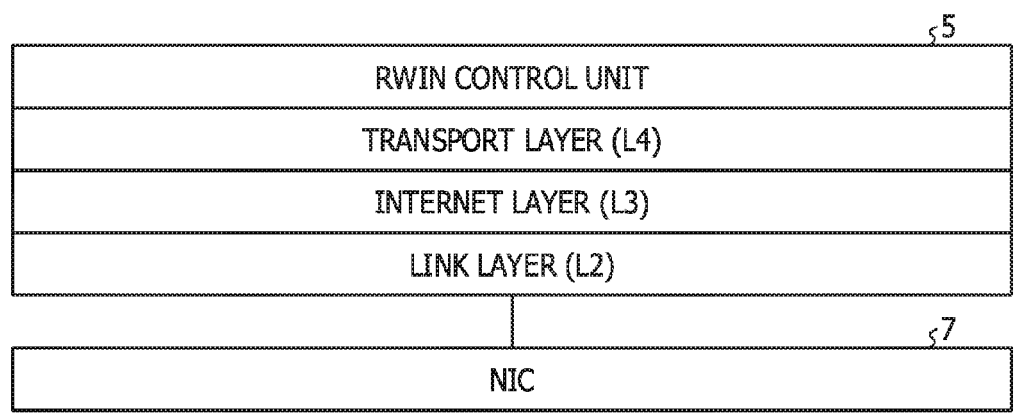
FIG. 3 represents positioning of an RWIN control unit in communication hierarchy.

FIG. 3 represents the positioning of the RWIN control unit 5 in the communication hierarchy. As illustrated in FIG. 3, the RWIN control unit 5 operates in the upper layer of a transport layer (L4), to which the TCP and the user datagram protocol (UDP) belong.

Figure 4:
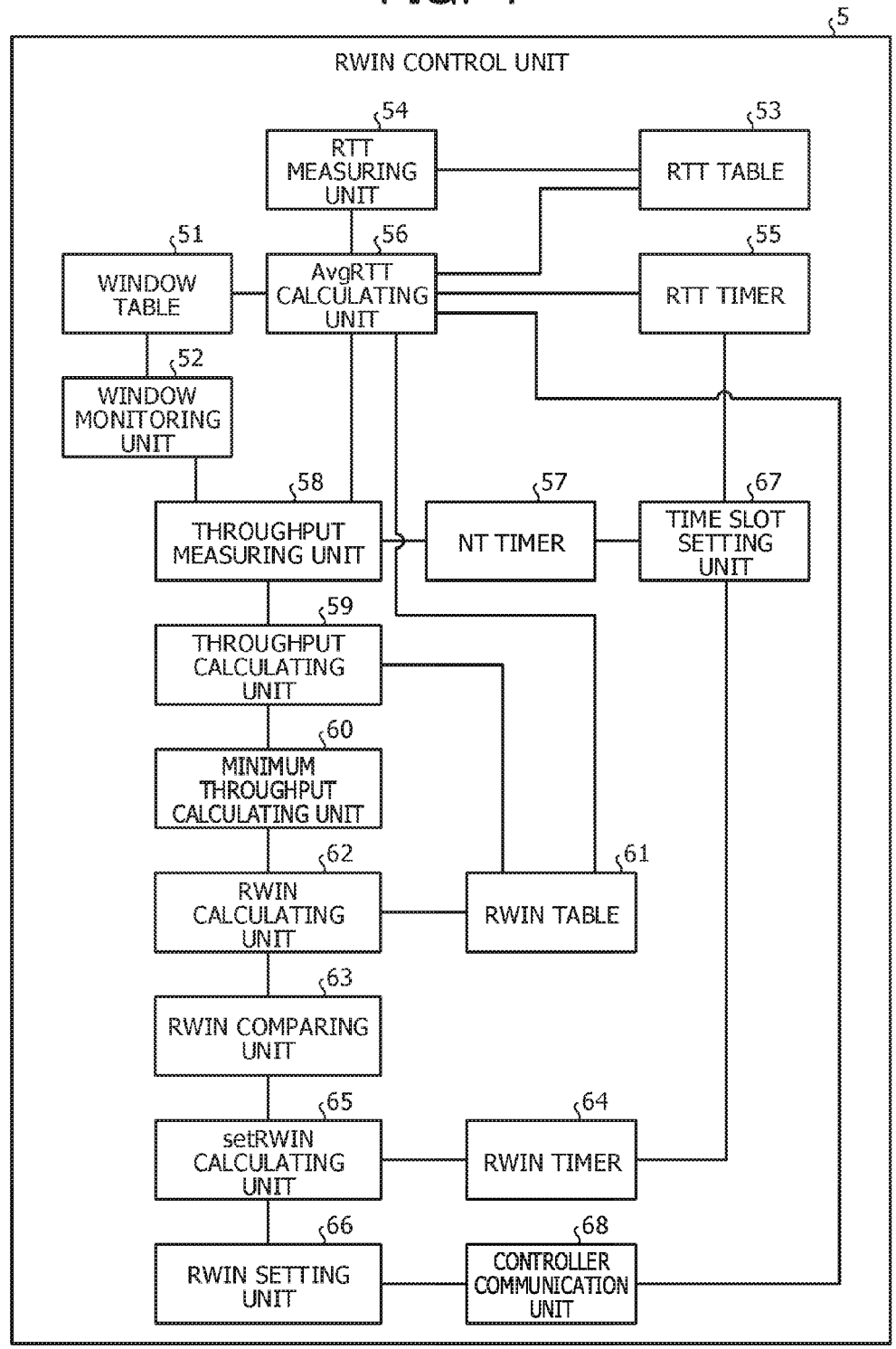
FIG. 4 illustrates a configuration of an RWIN control unit.

Next, the configuration of the RWIN control unit 5 will be described. FIG. 4 illustrates the configuration of the RWIN control unit 5. As illustrated in FIG. 4, the RWIN control unit 5 includes a window table 51, a window monitoring unit 52, an RTT table 53, an RTT measuring unit 54, an RTT timer 55, an AvgRTT calculating unit 56, an NT timer 57, and a throughput measuring unit 58. Furthermore, the RWIN control unit 5 includes a throughput calculating unit 59, a minimum throughput calculating unit 60, an RWIN table 61, an RWIN calculating unit 62, an RWIN comparing unit 63, an RWIN timer 64, a setRWIN calculating unit 65, and an RWIN setting unit 66. Moreover, the RWIN control unit 5 includes a time slot setting unit 67 and a controller communication unit 68.

The window table 51 stores information used for monitoring of a congestion window. FIG. 5 illustrates one example of items stored by the window table 51 about each elephant flow. As illustrated in FIG. 5, the window table 51 stores "index," "5 tuples," "number of previous packets," "number of present packets," "RTT," and "initial ACK" about each elephant flow.

"Index" is the index of an elephant flow. "5 tuples" is information to identify the flow and is transmission source Internet protocol (IP), transmission destination IP, transmission source port, transmission destination port, and protocol. The transmission source IP is the IP address of the transmission source of a packet. The transmission destination IP is the IP address of the transmission destination of the packet. The transmission source port is the port number of the transmission source of the packet. The transmission destination port is the port number of the transmission destination of the packet. The protocol is the communication protocol of the flow.

Figure 6:
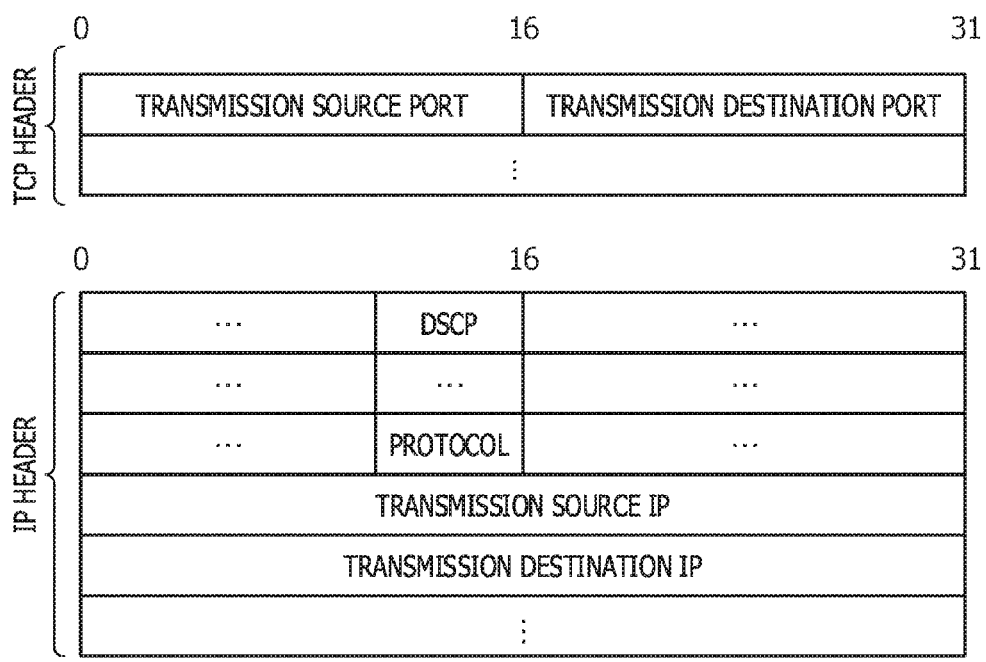
FIG. 6 illustrates storing places of 5 tuples and a differentiated services code point (DSCP)

FIG. 6 illustrates the storing places of the 5 tuples and a DSCP. As illustrated in FIG. 6, the transmission source port and the transmission destination port are included in a TCP header. Furthermore, the transmission source IP, the transmission destination IP, the protocol, and the DSCP are included in an IP header. The DSCP is used as the storing place of information indicating whether or not the flow is an elephant flow.

Figure 7:
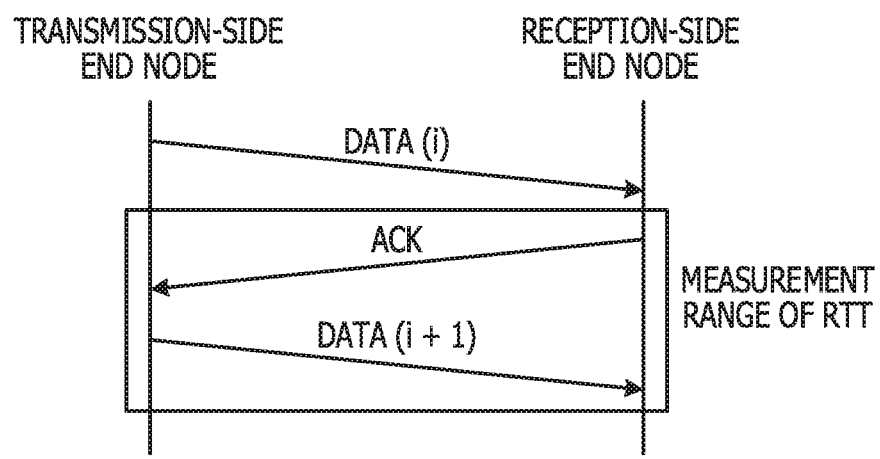
FIG. 7 illustrates a measurement range of an RTT.

"Number of previous packets" is the number of packets received in the previous data transfer. "Number of present packets" is the number of packets received in the present data transfer. "RTT" is the time from transmission of an ACK to reception of the next data. FIG. 7 illustrates a measurement range of an RTT. As illustrated in FIG. 7, the RTT is measured as the time from a clock time when an ACK is transmitted in response to i-th data to a clock time when (i+1)-th data is received. "Initial ACK" is the clock time of the first ACK for measuring the RTT.

Referring back to FIG. 4, the window monitoring unit 52 monitors the congestion window of an elephant flow by using the window table 51 until the congestion window enters the congestion avoidance phase. The congestion avoidance phase is a steady state in which the size of the congestion window gently increases, for example, increases from the previous window by 1.

Figure 8:
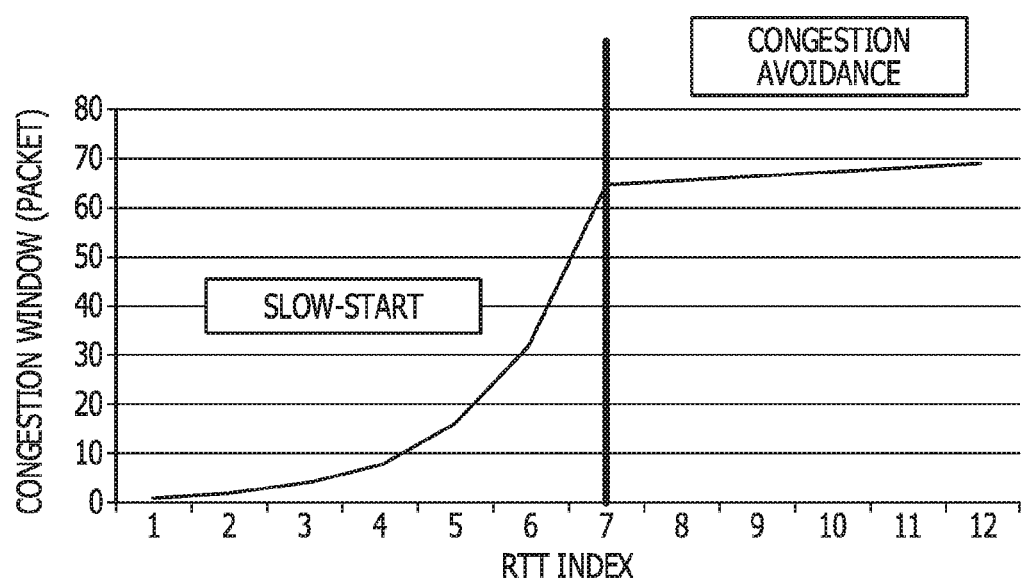
FIG. 8 is a diagram for explaining a congestion avoidance phase.

FIG. 8 is a diagram for explaining the congestion avoidance phase. In FIG. 8, the abscissa axis is the RTT index indicating the number of times of data transfer and the ordinate axis indicates the congestion window by the number of packets. As illustrated in FIG. 8, in the initial period of data transfer, the congestion window drastically increases exponentially for example so that the occurrence of congestion may be avoided. Then, the degree of increase becomes gentle when the congestion window becomes a certain level of size. Such a steady state in which the increase in the congestion window has become gentle is the congestion avoidance phase. The reception-side end node 3 measures the throughput of each flow in the congestion avoidance phase.

The RTT table 53 stores information used for the measurement of the RTT. The RWIN control unit 5 includes the RTT table 53 on each elephant flow basis. FIG. 9 illustrates one example of items stored by the RTT table 53 about each RTT. As illustrated in FIG. 9, the RTT table 53 stores "index," "RTT," "ACK time," "ACK number," and "number of failures" about each RTT.

"Index" is the index of an RTT. "RTT" is the time from transmission of an ACK to reception of the next data. "ACK time" is the clock time when the ACK is transmitted. "ACK number" is a value obtained by adding the maximum segment size (MSS) to the sequence number of the ACK. The MSS is 1500 for example. "Number of failures" is the number of times of non-correspondence through comparison between the ACK number and a data number that is the sequence number of data.

The RTT measuring unit 54 measures the time from transmission of an ACK to reception of the next data as the RTT by using the RTT table 53. The RTT timer 55 is a timer that measures a slot for calculating the average of the RTT. The slot is a time segment having a substantially constant size. The RTT measuring unit 54 measures the RTT while the RTT timer 55 is not 0. When the RTT timer 55 becomes 0, the AvgRTT calculating unit 56 calculates the average of the RTT of the respective elephant flows by using the RTT table 53.

The NT timer 57 is a timer that measures a slot for measuring the throughput. The throughput measuring unit 58 measures the throughput of the elephant flow that has entered the congestion avoidance phase in a throughput measurement slot. The throughput measurement slot is a time zone in which the throughput is measured. The RWIN control unit 5 bisects the time into the throughput measurement slot and an RWIN control slot.

Figure 10:
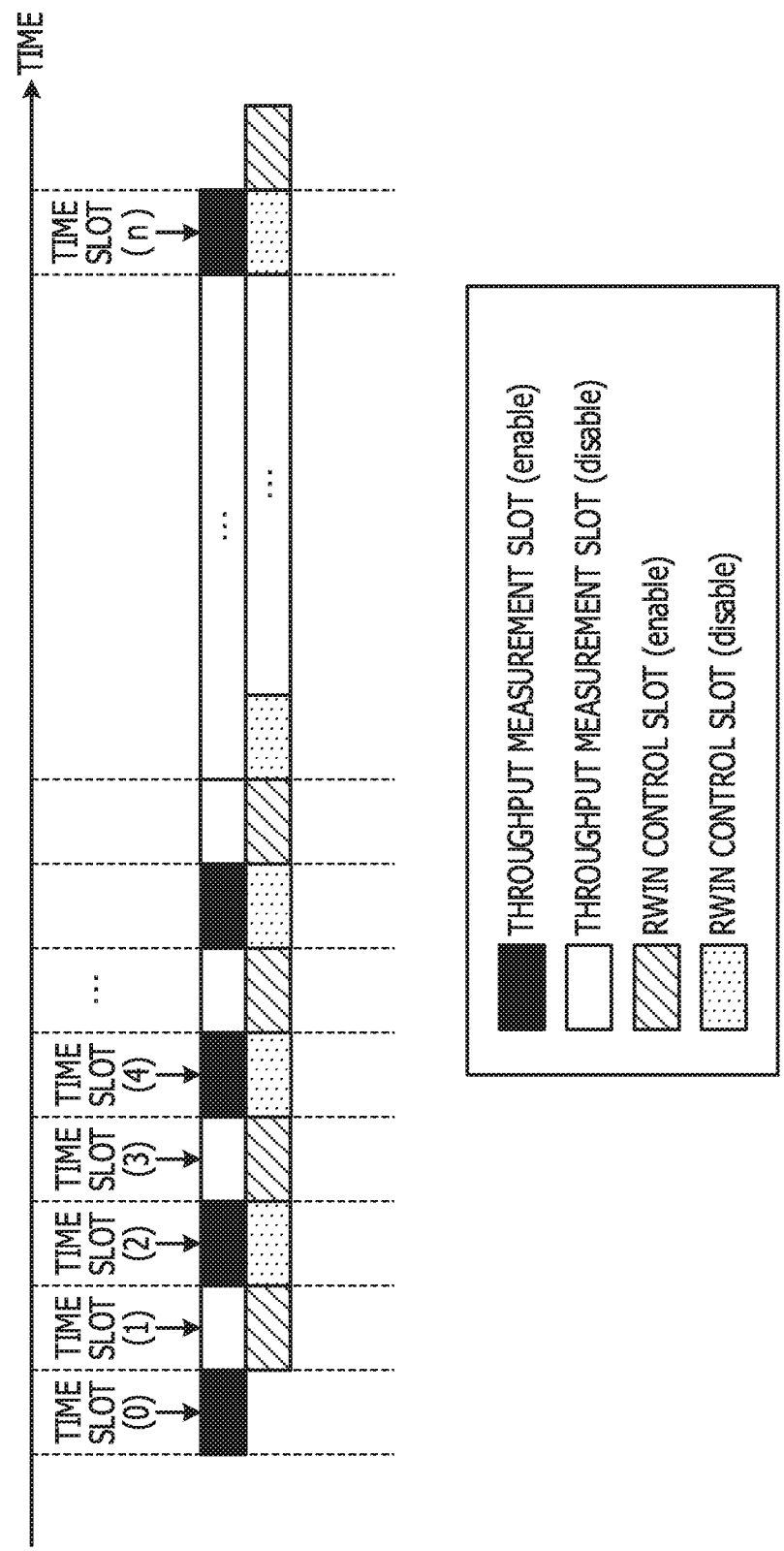
FIG. 10 is a diagram for explaining a throughput measurement slot and an RWIN control slot.

FIG. 10 is a diagram for explaining the throughput measurement slot and the RWIN control slot. In FIG. 10, "Time" of the abscissa axis represents the time. As illustrated in FIG. 10, the time is divided into time slots having substantially constant time intervals and the time slots alternately serve as the throughput measurement slot and the RWIN control slot. When the throughput measurement slot is enabled, the RWIN control slot is disabled. When the throughput measurement slot is disabled, the RWIN control slot is enabled. For example, time slot (0) is the throughput measurement slot and time slot (1) is the RWIN control slot. Time slot (2) is the throughput measurement slot and time slot (3) is the RWIN control slot.

The throughput calculating unit 59 calculates the throughput of each elephant flow. The minimum throughput calculating unit 60 calculates the minimum throughput among the throughputs of the elephant flows.

The RWIN table 61 stores information used for calculation of the RWIN. FIG. 11 is a diagram illustrating one example of items stored by the RWIN table 61 about each elephant flow. As illustrated in FIG. 11, the RWIN table 61 stores "index," "number of bytes," "RTT," "throughput," and "calRWIN" about each elephant flow.

"Index" is the index of an elephant flow. "Number of bytes" is the number of bytes measured in the throughput measurement slot. "RTT" is the average RTT calculated by the AvgRTT calculating unit 56. "Throughput" is the throughput of the elephant flow. "calRWIN" is an RWIN calculated from the minimum throughput.

The RWIN calculating unit 62 calculates the RWIN from the minimum throughput and the RU. The unit of the RWIN is byte. Furthermore, the RU used here is the value obtained by averaging the RU of the respective elephant flows.

The RWIN comparing unit 63 compares the RWIN calculated by the RWIN calculating unit 62 with the size of one packet and sets the larger as the calRWIN. If the RWIN calculated by the RWIN calculating unit 62 is smaller than the size of the packet, the RWIN is less than one packet and therefore the RWIN comparing unit 63 sets the size of one packet as the calRWIN.

The RWIN timer 64 is a timer that measures the RWIN control slot. The setRWIN calculating unit 65 calculates an adjustment rate setRWIN from the calRWIN and a in the RWIN control slot. For example, the setRWIN calculating unit 65 calculates the setRWIN by an expression of setRWIN=calRWIN+calRWIN×α/2. Here, α is defined by the following expression (1).

$$a = \frac{MAX_{i=0,I}|f_i - \text{Rate}|}{\text{Rate}} \qquad (1)$$

In expression (1), "Rate" is the adjustment rate calculated in the previous RWIN control slot and "$f_i$" is the present throughput of the i-th elephant flow. "$MAX_{i=0,I}$" takes the maximum value of $|f_i-\text{Rate}|$ regarding elephant flows from the 0-th elephant flow to the I-th elephant flow. I+1 is the number of elephant flows. In $f_i$, the throughput of the elephant flow selected as the minimum throughput is not included.

As represented in expression (1), α is the ratio between "the maximum value of the difference between the present throughput of the elephant flow and the previous adjustment rate" and "the previous adjustment rate." However, α satisfies a relationship of $0 \le \alpha \le 1$, and α is set to 1 if α is larger than 1. The case in which a is close to 1 is the case in which the difference between the previous adjustment rate and the throughput of the present elephant flow is large. The case in which a is close to 0 is the case in which the difference between the previous adjustment rate and the throughput of the present elephant flow is small. Furthermore, if there are plural elephant flows and α is equal to 0, the setRWIN calculating unit 65 forcibly sets α to 0.1 for example. The setRWIN calculating unit 65 may forcibly set the value of α to a value other than 0.1.

Figure 12:
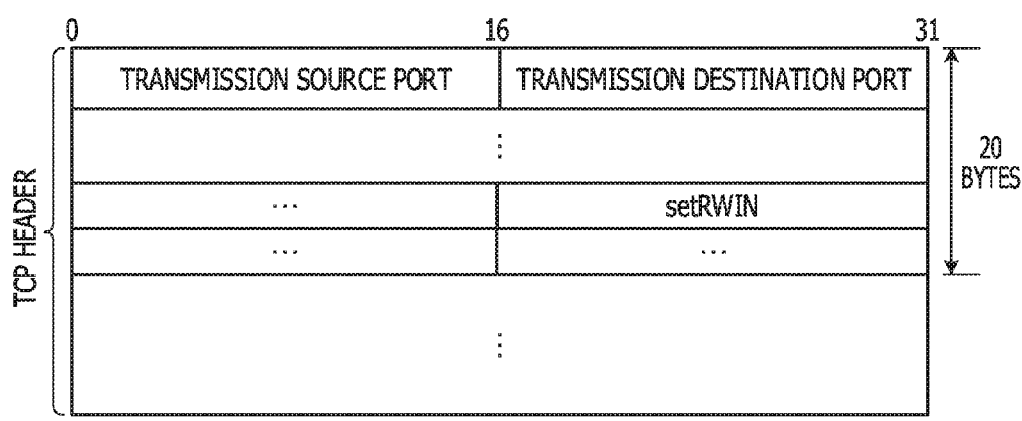
FIG. 12 illustrates a setting place of setRWIN.

The RWIN setting unit 66 sets the setRWIN calculated by the setRWIN calculating unit 65 in an ACK. FIG. 12 illustrates the setting place of the setRWIN. As illustrated in FIG. 12, the setRWIN is set in an RWIN field in a TCP header.

The time slot setting unit 67 sets the time intervals of the throughput measurement slot, the RWIN control slot, and the RTT slot in the NT timer 57, the RWIN timer 64, and the RTT timer 55, respectively. The time intervals are 1 milliseconds, 100 milliseconds, and RTT for example. The time intervals of the throughput measurement slot and the RWIN control slot may be different from each other.

The controller communication unit 68 transmits the average of the RTT to a controller and receives a setting value of the RWIN to transfer the setting value to the RWIN setting unit 66. The controller will be described in embodiment 2.

Figure 13:
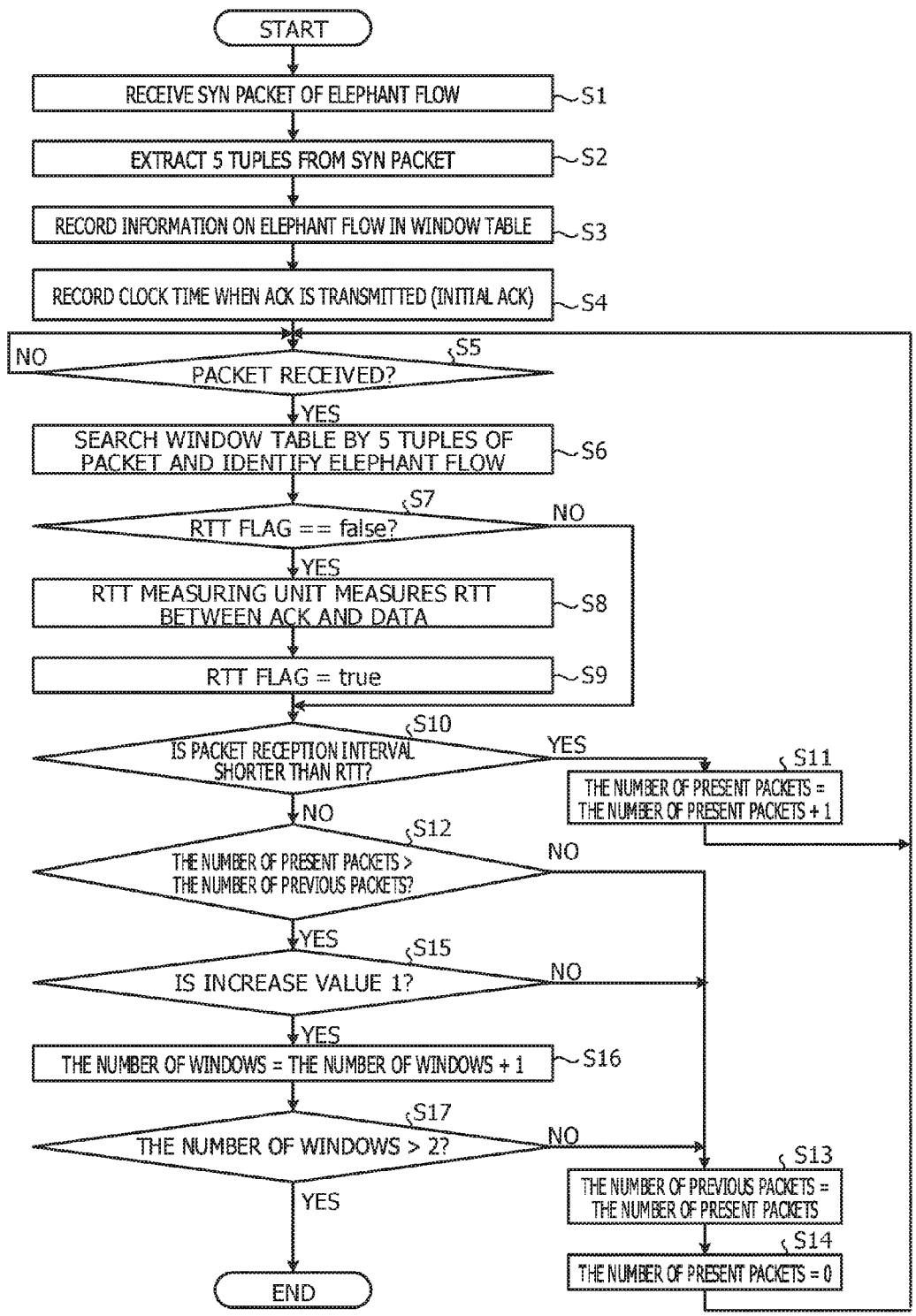
FIG. 13 is a flowchart illustrating a flow of monitoring processing of a congestion window.

Next, the flow of monitoring processing of the congestion window will be described. FIG. 13 is a flowchart illustrating the flow of the monitoring processing of the congestion window. As illustrated in FIG. 13, the window monitoring unit 52 receives a synchronized (SYN) packet of an elephant flow (step S1) and extracts 5 tuples from the SYN packet (step S2).

Then, the window monitoring unit 52 records information on the elephant flow including information on the 5 tuples in the window table 51 (step S3) and records the clock time when an ACK is transmitted as the initial ACK in the window table 51 (step S4). Then, the window monitoring unit 52 determines whether or not a packet is received (step S5) and waits for reception of a packet if a packet is not received.

On the other hand, if a packet is received, the window monitoring unit 52 searches the window table 51 by the 5 tuples of the received packet and identifies the elephant flow (step S6). Furthermore, the window monitoring unit 52 determines whether or not an RTT flag is "false" (step S7). The RTT flag is a flag indicating whether or not measurement of the RTT has been carried out and "false" indicates that the measurement has not been carried out. In addition, "=" in the step S7 is a symbol representing "equal."

Then, if the RTT flag is not "false," the RTT has been measured and thus the window monitoring unit 52 proceeds to a step S10. On the other hand, if the RTT flag is "false," the RTT measuring unit 54 measures the RTT between ACK and data (step S8) and sets the RTT flag to "true" (step S9).

Then, the window monitoring unit 52 determines whether or not the packet reception interval is shorter than the RTT on the basis of the information of the window table 51 relating to the elephant flow identified in the step S6 (step S10). If the packet reception interval is shorter than the RTT as the result of the determination, data is being received and thus the window monitoring unit 52 adds 1 to the number of present packets in the window table 51 (step S11) to return to the step S5.

On the other hand, if the packet reception interval is not shorter than the RTT, the window monitoring unit 52 determines whether or not the number of present packets in the window table 51 is larger than the number of previous packets (step S12). If the number of present packets is not larger than the number of previous packets as the result of the determination, the elephant flow is not in the congestion avoidance phase. Thus, the window monitoring unit 52 sets the number of present packets as the number of previous packets (step S13) and turns the number of present packets to 0 (step S14). Then, the window monitoring unit 52 returns to the step S5.

On the other hand, if the number of present packets is larger than the number of previous packets, the window monitoring unit 52 determines whether or not the value of the increase from the number of previous packets to the number of present packets is 1 (step S15). If the increase value is not 1, the elephant flow is not in the congestion avoidance phase and thus the window monitoring unit 52 moves to the step S13. On the other hand, if the increase value is 1, the window monitoring unit 52 increases the number of windows by 1 (step S16) and determines whether or not the number of windows is larger than 2 (step S17). The number of windows represents the number of times of that the value of the increase from the number of previous packets to the number of present packets is 1. That is, the number of windows represents the number of times of that the state of the window becomes the congestion avoidance.

Then, if the number of windows is larger than 2, the window monitoring unit 52 determines that the elephant flow has entered the congestion avoidance phase, and ends the processing. On the other hand, if the number of windows is not larger than 2, the number of windows is still insufficient to determine that the elephant flow has entered the congestion avoidance phase, and thus the window monitoring unit 52 moves to the step S13.

In this manner, the window monitoring unit 52 determines whether or not the elephant flow has entered the congestion avoidance phase by monitoring the number of packets in one time of data transfer by using the window table 51.

Figure 14:
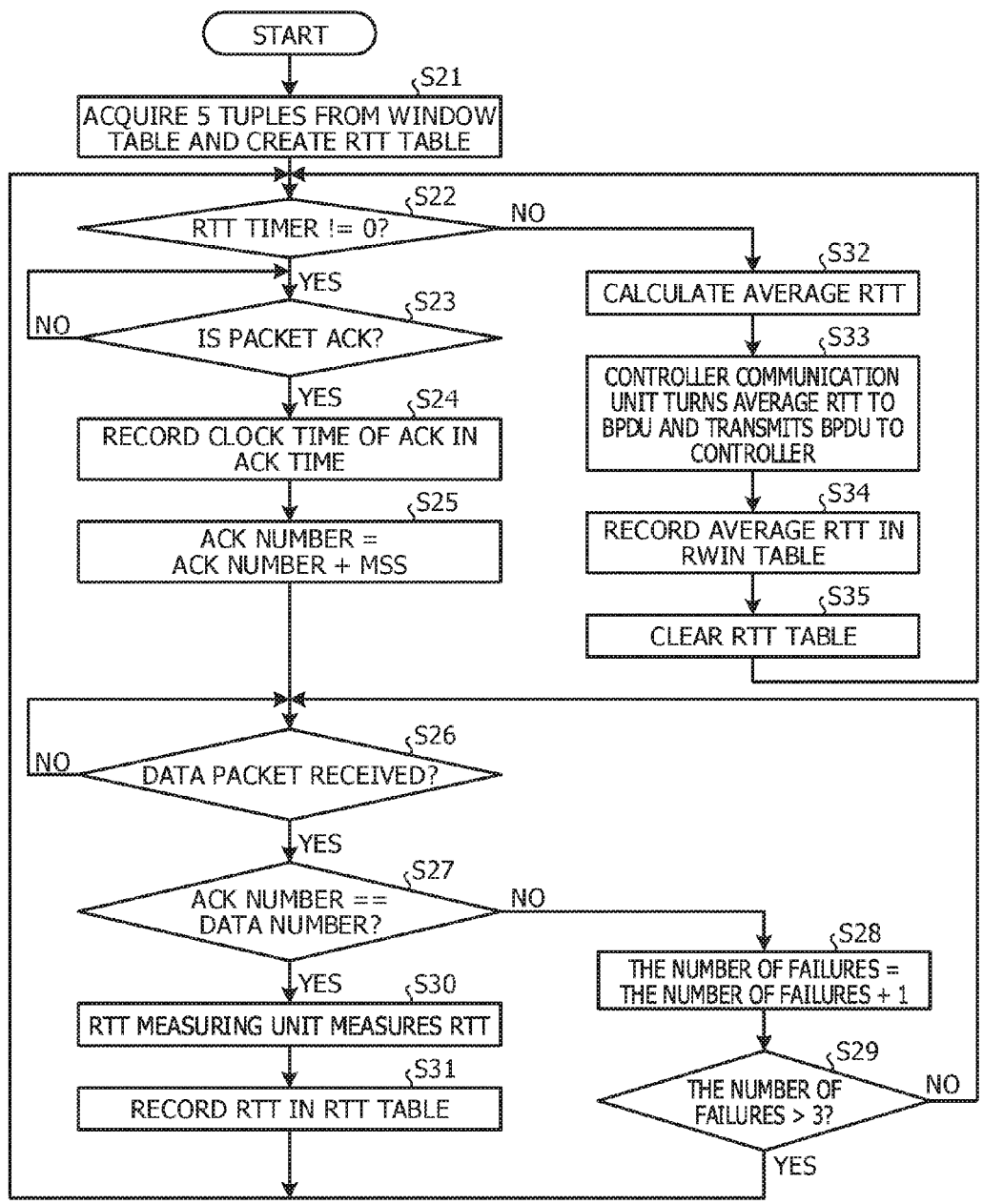
FIG. 14 is a flowchart illustrating a flow of measurement processing of an RTT.

Next, the flow of measurement processing of the RTT will be described. FIG. 14 is a flowchart illustrating the flow of the measurement processing of the RTT. As illustrated in FIG. 14, the AvgRTT calculating unit 56 acquires 5 tuples from the window table 51 and creates the RTT table 53 regarding a target elephant flow (step S21).

Then, the AvgRTT calculating unit 56 determines whether or not the RTT timer 55 is not 0 (step S22). If the RTT timer 55 is not 0, the present time zone is a time zone during which the RTT is measured and thus the AvgRTT calculating unit 56 determines whether or not a packet is an ACK (step S23). If the packet is not an ACK as the result of the determination, the AvgRTT calculating unit 56 waits until an ACK comes.

On the other hand, if the packet is an ACK, the AvgRTT calculating unit 56 records the clock time of the ACK in the ACK time in the RTT table 53 (step S24) and adds the MSS to the ACK number (step S25). Then, the AvgRTT calculating unit 56 determines whether or not a data packet is received (step S26) and waits until a data packet is received if a data packet is not received.

On the other hand, if a data packet is received, the AvgRTT calculating unit 56 determines whether or not the ACK number is equal to the data number (step S27). If the ACK number is not equal to the data number as the result, the AvgRTT calculating unit 56 adds 1 to the number of failures (step S28) and determines whether or not the number of failures is larger than 3 (step S29). Then, the AvgRTT calculating unit 56 returns to the step S26 if the number of failures is not larger than 3, and returns to the step S22 if the number of failures is larger than 3.

On the other hand, if the ACK number is equal to the data number, the RTT measuring unit 54 measures the RTT from the ACK time and the clock time when the data packet is received (step S30) and records the RTT in the RTT table 53 (step S31). Then, the AvgRTT calculating unit 56 returns to the step S22.

On the other hand, if the RTT timer 55 is 0, the AvgRTT calculating unit 56 calculates the average RTT from plural RTTs recorded in the RTT table 53 (step S32) and the controller communication unit 68 turns the average RTT to a bridge protocol data unit (BPDU) and transmits the BPDU to a controller (step S33). The controller will be described in embodiment 2.

Then, the AvgRTT calculating unit 56 records the average RTT in the RWIN table 61 (step S34) and clears the RTT table 53 (step S35) to return to the step S22.

In this manner, the AvgRTT calculating unit 56 calculates the average of the RTT and records the average in the RWIN table 61 and thereby the throughput calculating unit 59 calculates the throughput of the elephant flow by using the average of the RTT.

Figure 15:
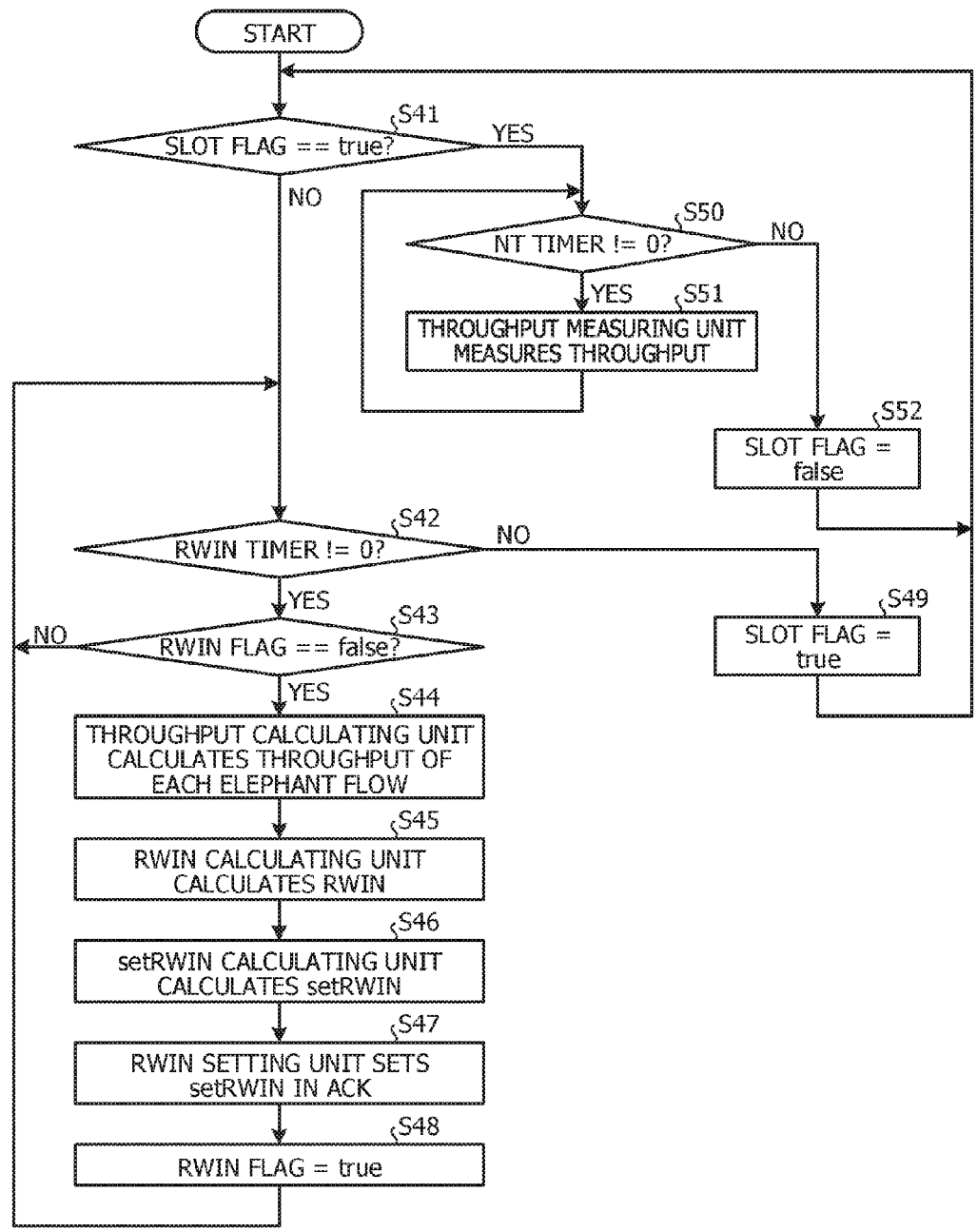
FIG. 15 is a flowchart illustrating a flow of setting processing of RWIN.

Next, the flow of setting processing of the RWIN will be described. FIG. 15 is a flowchart illustrating the flow of the setting processing of the RWIN. As illustrated in FIG. 15, the RWIN control unit 5 determines whether or not a slot flag is "true" (step S41). The slot flag is a flag indicating whether the present slot is the throughput measurement slot or the RWIN control slot. If being "true," the slot flag indicates that the present slot is the throughput measurement slot. If being "false," the slot flag indicates that the present slot is the RWIN control slot.

If it is determined that the slot flag is not "true," the RWIN control unit 5 determines whether or not the RWIN timer 64 is not 0 (step S42). If the RWIN timer 64 is not 0, the RWIN control unit 5 determines whether or not an RWIN flag is "false" (step S43). The RWIN flag is a flag indicating whether or not RWIN control has been carried out in the present RWIN control slot. If being "true," the RWIN flag indicates that the RWIN control has been carried out. If being "false," the RWIN flag indicates that the RWIN control has not been carried out. If it is determined that the RWIN flag is not "false," the RWIN control unit 5 returns to the step S42.

On the other hand, if the RWIN flag is "false," the throughput calculating unit 59 calculates the throughput of each elephant flow (step S44) and the RWIN calculating unit 62 calculates the RWIN from the minimum throughput (step S45). Then, the RWIN comparing unit 63 calculates the calRWIN. Then, the setRWIN calculating unit 65 calculates the setRWIN (step S46) and the RWIN setting unit 66 sets the setRWIN in an ACK for each elephant flow (step S47). Then, the RWIN control unit 5 sets the RWIN flag to "true" (step S48) and returns to the step S42.

Furthermore, if the RWIN timer 64 is 0 in the step S42, for change from the RWIN control slot to the throughput measurement slot, the RWIN control unit 5 sets the slot flag to "true" (step S49) and returns to the step S41.

In addition, if the slot flag is "true" in the step S41, the RWIN control unit 5 determines whether or not the NT timer 57 is not 0 (step S50). If the NT timer 57 is not 0 as the result of the determination, the throughput measuring unit 58 measures the throughput (step S51) and the RWIN control unit 5 returns to the step S50. On the other hand, if the NT timer 57 is 0, for change from the throughput measurement slot to the RWIN control slot, the RWIN control unit 5 sets the slot flag to "false" (step S52) and returns to the step S41.

In this manner, the RWIN setting unit 66 sets the setRWIN in the ACK for each elephant flow in the RWIN control slot, which allows the RWIN control unit 5 to carry out flow control so that the throughput may be equalized for each elephant flow.

Figure 16:
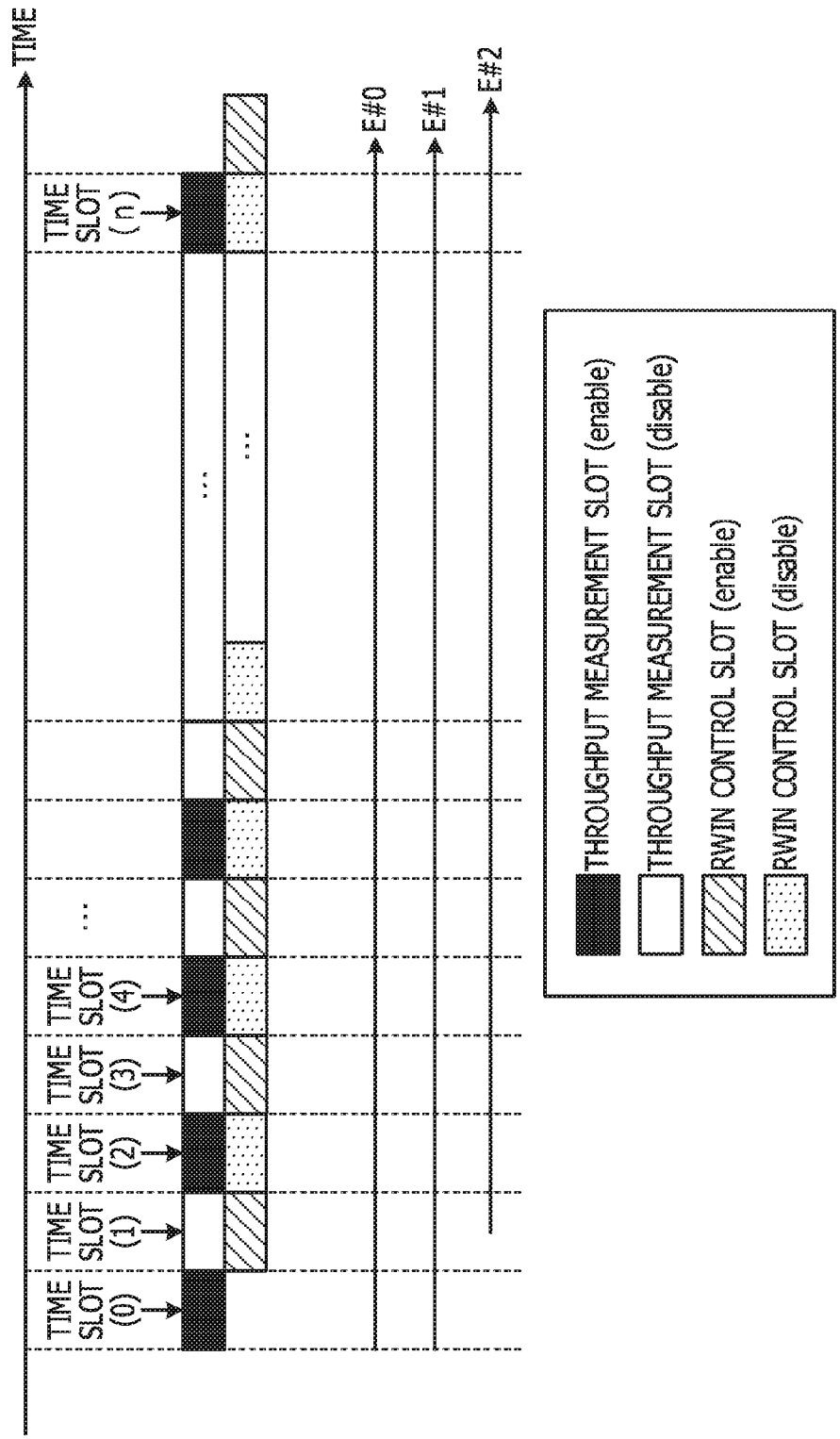
FIG. 16 illustrates an adjustment rate calculation example.

Next, adjustment rate calculation examples will be described by using FIG. 16 and FIG. 17. FIG. 16 illustrates an adjustment rate calculation example. In FIG. 16, E#0, E#1, and E#2 are elephant flows in the congestion avoidance phase. Suppose that there are two elephant flows E#0 and E#1 in time slot (0) and elephant flow E#2 appears in time slot (1) as illustrated in FIG. 16.

The throughput measuring unit 58 measures the throughputs in time slot (0) as a throughput measurement slot and the throughput calculating unit 59 calculates the throughputs in time slot (1) as an RWIN control slot. Here, suppose that the throughputs of E#0 and E#1 calculated by the throughput calculating unit 59 are 1 Gbps (gigabits/second) and 1.2 Gbps, respectively.

In this case, the minimum throughput is 1 Gbps. Because the previous adjustment rate does not exist, $\alpha$ is set to 0 as the default value, so that setRWIN=calRWIN=1 Gbps is obtained. Here, assuming that RTT=0.5 milliseconds, setRWIN=1 Gbps×0.5×10$^{-3}$ s=500 Kbits=62.5 Kbytes is obtained. The value of the RTT is the average of the RTT of E#0 and E#1.

Thereafter, the throughput measuring unit 58 measures the throughputs in time slot (2) as a throughput measurement slot and the throughput calculating unit 59 calculates the throughputs in time slot (3) as an RWIN control slot. Here, suppose that the throughputs of E#0, E#1, and E#2 calculated by the throughput calculating unit 59 are 1 Gbps, 1.1 Gbps, and 1.2 Gbps, respectively.

In this case, the minimum throughput is 1 Gbps. Furthermore, $\alpha$=0.2 Gbps/1 Gbps=0.2 and calRWIN=1 Gbps are obtained. Therefore, setRWIN=1 Gbps+1 Gbps×0.2/2=1.1 Gbps. Here, assuming that RTT=0.5 milliseconds, setRWIN=1.1 Gbps×0.5×10$^{-3}$ s=550 Kbits=68.75 Kbytes is obtained. The value of the RTT is the average of the RTT of E#0, E#1, and E#2. In this manner, when the measured throughput is higher than the adjustment rate, the RWIN control unit 5 raises the adjustment rate.

If the throughputs of E#0, E#1, and E#2 calculated by the throughput calculating unit 59 in time slot (3) are 1 Gbps, 1.1 Gbps, and 0.8 Gbps, respectively, the minimum throughput is 0.8 Gbps. Furthermore, $\alpha$=0.1 Gbps/1 Gbps=0.1 and calRWIN=0.8 Gbps are obtained. Therefore, setRWIN=0.8 Gbps+0.8 Gbps×0.1/2=0.84 Gbps. Here, assuming that RTT=0.5 milliseconds, setRWIN=0.84 Gbps×0.5×10$^{-3}$ s=420 Kbits=52.5 Kbytes is obtained. In this case, the adjustment rate varies.

Figure 17:
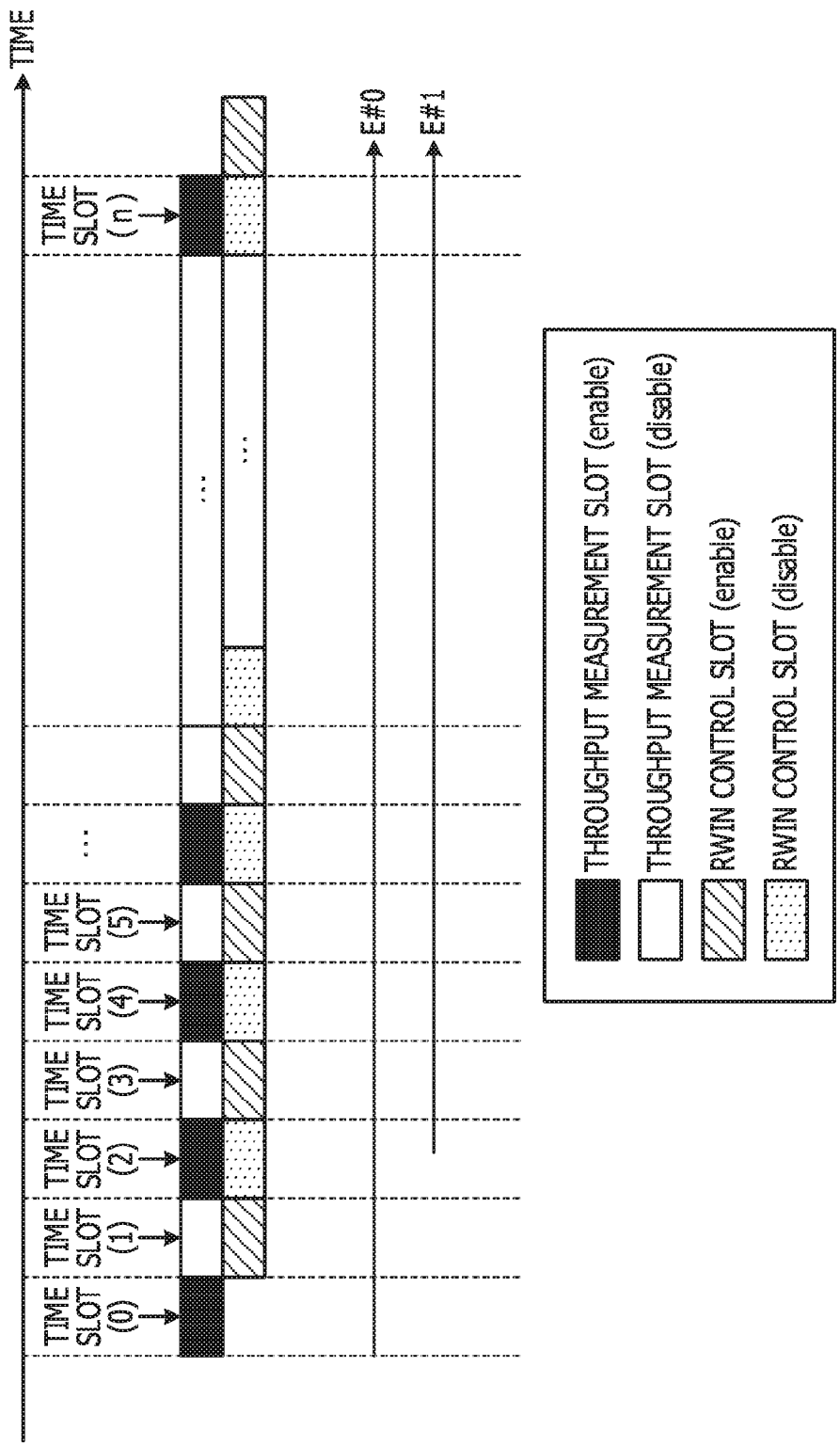
FIG. 17 illustrates an adjustment rate calculation example when a flow appears in the middle of a throughput measurement slot.

FIG. 17 illustrates an adjustment rate calculation example when a flow appears in the middle of a throughput measurement slot. Suppose that there is elephant flow E#0 in time slot (0) and elephant flow E#1 appears in time slot (2) as illustrated in FIG. 17.

The throughput measuring unit 58 measures the throughputs in time slot (0) as a throughput measurement slot and the throughput calculating unit 59 calculates the throughputs in time slot (1) as an RWIN control slot. Here, suppose that the throughput of E#0 calculated by the throughput calculating unit 59 is 1 Gbps.

In this case, the minimum throughput is 1 Gbps. Because the previous adjustment rate does not exist, $\alpha$ is set to 0 as the default value, so that setRWIN=calRWIN=1 Gbps is obtained. Here, assuming that RTT=0.5 milliseconds, setRWIN=1 Gbps×0.5×10$^{-3}$ s=500 Kbits=62.5 Kbytes is obtained.

Thereafter, when the throughput measuring unit 58 measures the throughput in time slot (2) as a throughput measurement slot, E#1 appears in the middle. Then, the throughput calculating unit 59 calculates the throughputs in time slot (3) as an RWIN control slot. Here, suppose that the throughputs of E#0 and E#1 calculated by the throughput calculating unit 59 are 1 Gbps and 0.6 Gbps, respectively.

In this case, the throughput of E#1, which appeared in the middle, is not used and the minimum throughput is 1 Gbps and $\alpha$=0. Therefore, setRWIN=calRWIN=1 Gbps is obtained. Here, assuming that RTT=0.5 milliseconds, setRWIN=1 Gbps×0.5×10$^{-3}$ s=500 Kbits=62.5 Kbytes is obtained. Furthermore, the RWIN control unit 5 also sets the RWIN of E#1, which appeared in the middle, to 62.5 Kbytes.

Then, the throughput calculating unit 59 calculates the throughputs in time slot (5) as an RWIN control slot. Here, suppose that the throughputs of E#0 and E#1 calculated by the throughput calculating unit 59 are 1 Gbps and 0.8 Gbps, respectively.

In this case, the minimum throughput is 0.8 Gbps and $\alpha$=0. Here, because there are plural elephant flows and $\alpha$=0, the setRWIN calculating unit 65 forcibly sets $\alpha$=0.1. The setRWIN calculating unit 65 may forcibly set the value of $\alpha$ to a value other than 0.1. In this case, setRWIN=0.8 Gbps+0.8 Gbps×0.1/2=0.84 Gbps. Here, assuming that RTT=0.5 milliseconds, setRWIN=0.84 Gbps×0.5×10$^{-3}$ s=420 Kbits=52.5 Kbytes is obtained. In this manner, when a flow appears in the middle of a throughput measurement slot, the throughput of the flow that appeared in the middle is used in the next RWIN control slot of the RWIN control slot subsequent to the throughput measurement slot.

Figure 18:
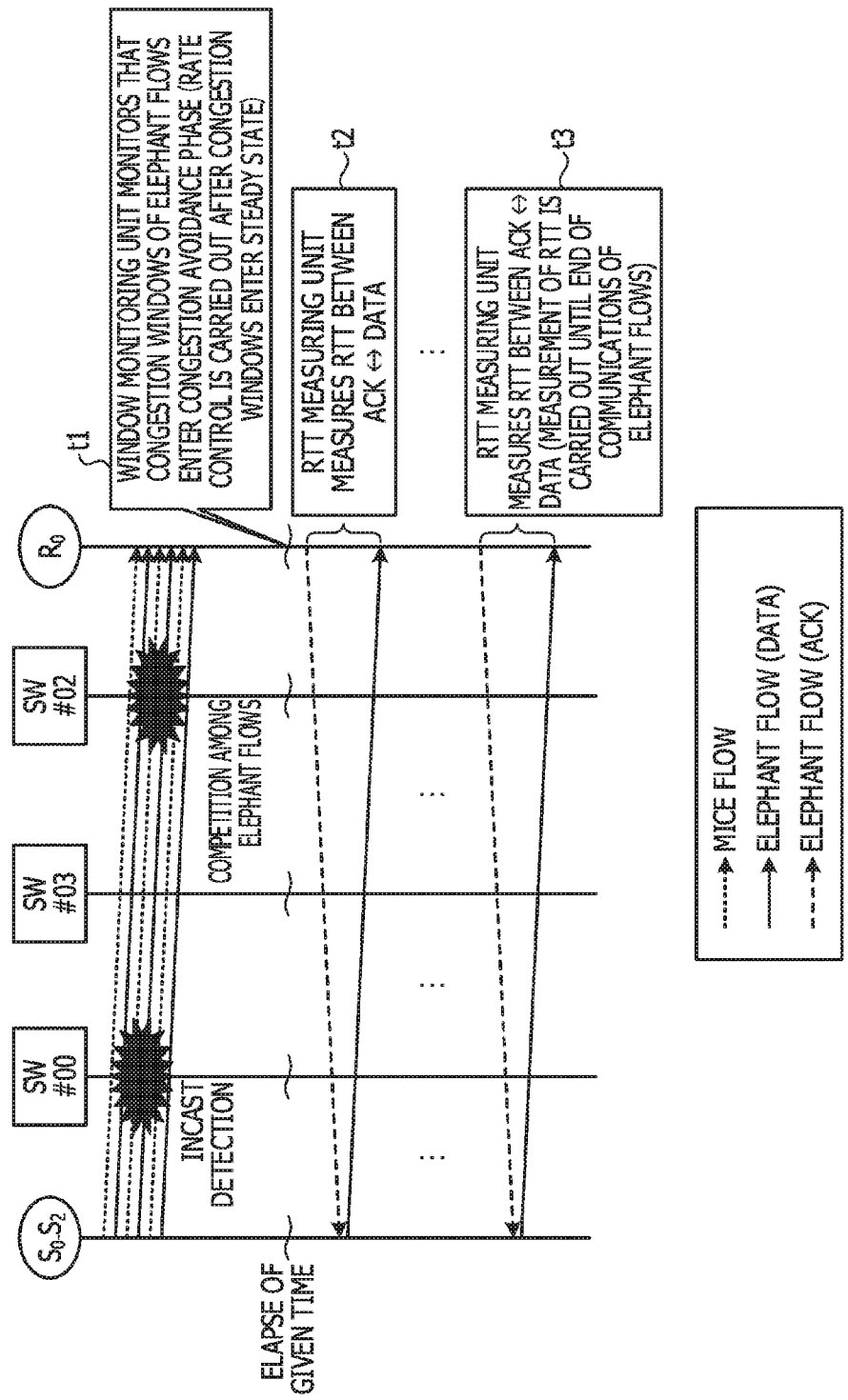
FIG. 18 is a diagram for explaining a precondition and advance preparation.
Figure 19:
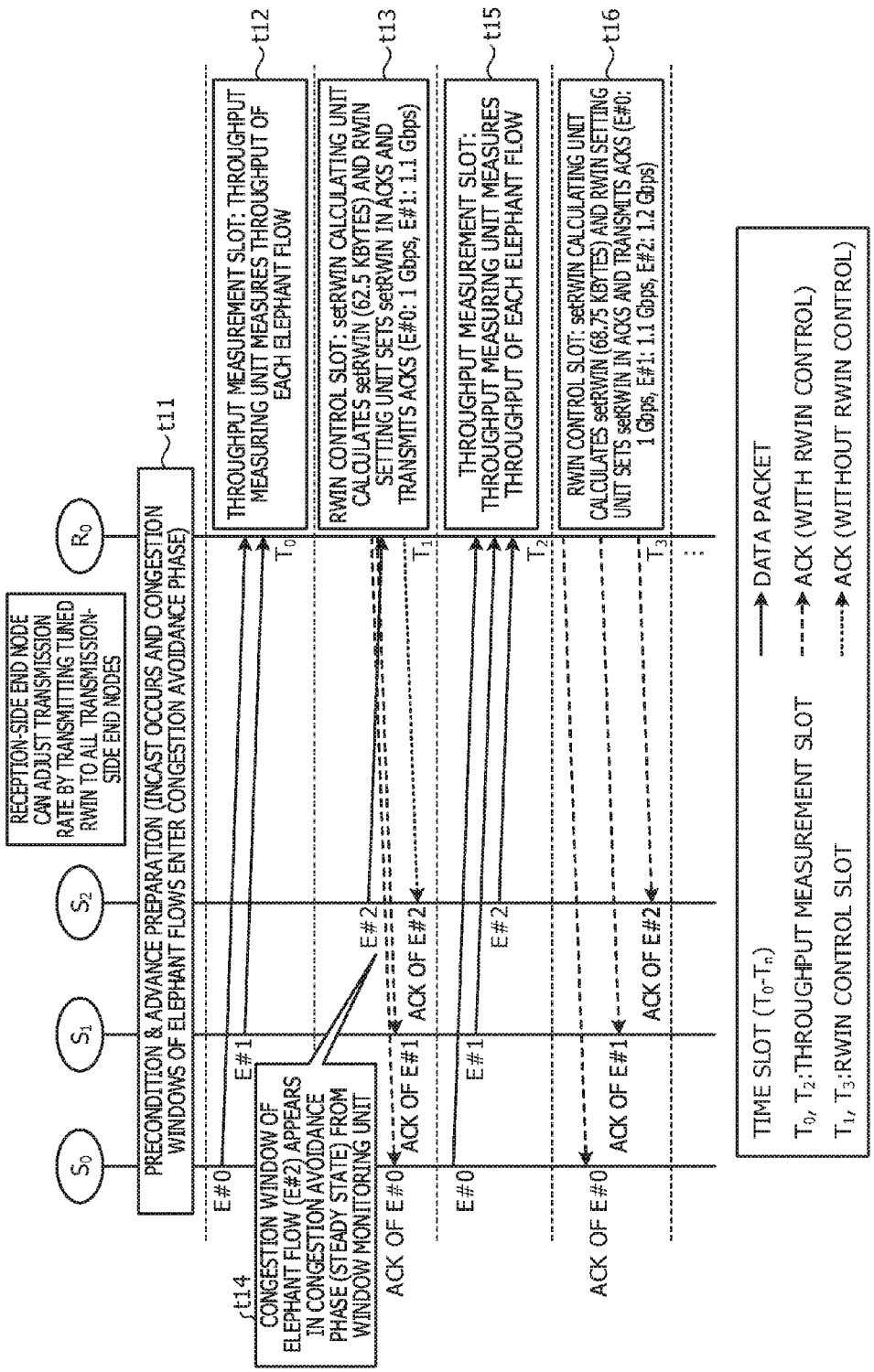
FIG. 19 is a first diagram illustrating a sequence of rate control.

Next, the sequence of the rate control will be described by using FIGS. 18, 19, and 20. FIG. 19 corresponds to the example illustrated in FIG. 16, and FIG. 20 corresponds to the example illustrated in FIG. 17. FIG. 18 is a diagram for explaining a precondition and advance preparation. In FIG. 18, solid line arrows indicate data of elephant flows and dashed line arrows indicate ACKs of elephant flows. Dotted line arrows indicate mice flows.

As illustrated in FIG. 18, as the precondition, the transmission-side end nodes $S_0$ to $S_2$ transmit packets of elephant flows and packets of mice flows to the reception-side end node $R_0$. Then, incast occurs at SW#00 and competition among elephant flows occurs at SW#02.

Furthermore, the window monitoring unit 52 monitors that the congestion windows of the elephant flows enter the congestion avoidance phase (step t1). Then, the RTT measuring unit 54 measures the RTT between ACK and data (step t2, step t3). The measurement of the RTT is carried out until the end of the communications of the elephant flows.

FIG. 19 is a first diagram illustrating the sequence of the rate control. FIG. 19 illustrates the case in which elephant flow E#2 appears in an RWIN control slot. In FIG. 19 and FIG. 20, $T_n$ represents time slot (n), and $T_0$, $T_2$, and $T_4$ represent throughput measurement slots and $T_1$, $T_3$, and $T_5$ represent RWIN control slots. Furthermore, solid line arrows indicate data packets. Dashed line arrows indicate ACKs in which the RWIN control is carried out and dotted line arrows indicate ACKs in which the RWIN control is not carried out.

As illustrated in FIG. 19, first the precondition and the advance preparation represented in FIG. 18 are completed (step t11). For example, incast occurs and the congestion windows of the elephant flows enter the congestion avoidance phase. Then, in $T_0$, the throughput measuring unit 58 measures the throughputs of elephant flows E#0 and E#1 (step t12).

Then, in $T_1$, the setRWIN calculating unit 65 calculates the setRWIN (62.5 Kbytes), and the RWIN setting unit 66 sets the setRWIN in the ACKs of E#0 and E#1 and transmits the ACKs (step t13). For the calculation of the setRWIN, 1 Gbps and 1.1 Gbps are used as the throughputs of E#0 and E#1, respectively. Furthermore, in $T_1$, E#2 appears in the congestion avoidance phase (step t14). However, the setRWIN is not set in the ACK of E#2.

Then, in $T_2$, the throughput measuring unit 58 measures the throughputs of elephant flows E#0, E#1, and E#2 (step t15). Then, in $T_3$, the setRWIN calculating unit 65 calculates the setRWIN (68.75 Kbytes), and the RWIN setting unit 66 sets the setRWIN in the ACKs of E#0, E#1, and E#2 and transmits the ACKs (step t16). For the calculation of the setRWIN, 1 Gbps, 1.1 Gbps, and 1.2 Gbps are used as the throughputs of E#0, E#1, and E#2, respectively.

If 1 Gbps, 1.1 Gbps, and 0.8 Gbps are used as the throughputs of E#0, E#1, and E#2, respectively, for the calculation of the setRWIN, the value of the setRWIN becomes 52.5 Kbytes.

Figure 20:
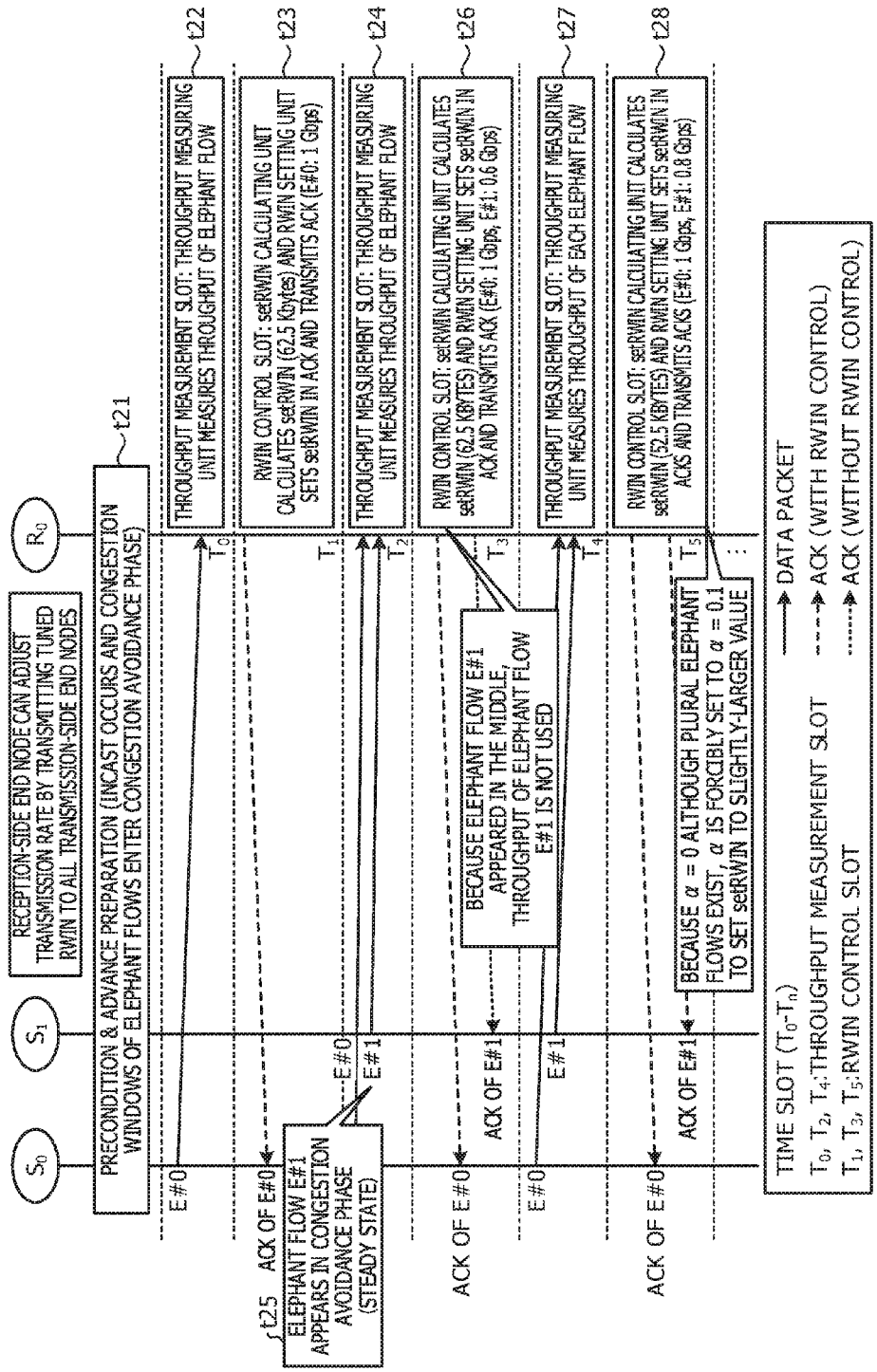
FIG. 20 is a second diagram illustrating a sequence of rate control.

FIG. 20 is a second diagram illustrating the sequence of the rate control. FIG. 20 illustrates the case in which an elephant flow appears in the middle of measurement of the throughput. As illustrated in FIG. 20, first the precondition and the advance preparation represented in FIG. 18 are completed (step t21). Then, in $T_0$, the throughput measuring unit 58 measures the throughput of elephant flow E#0 (step t22).

Then, in $T_1$, the setRWIN calculating unit 65 calculates the setRWIN (62.5 Kbytes) and the RWIN setting unit 66 sets the setRWIN in the ACK of E#0 and transmits the ACK (step t23). For the calculation of the setRWIN, 1 Gbps is used as the throughput of E#0.

Then, in $T_2$, the throughput measuring unit 58 measures the throughput of elephant flow E#0 (step t24). Furthermore, in $T_2$, elephant flow E#1 appears in the congestion avoidance phase (step t25). Then, in $T_3$, the setRWIN calculating unit 65 calculates the setRWIN (62.5 Kbytes) and the RWIN setting unit 66 sets the setRWIN in the ACK of E#0 and transmits the ACK (step t26). For the calculation of the setRWIN, 1 Gbps is used as the throughput of E#0. However, the throughput of E#1 is not used for the calculation of the setRWIN and the setRWIN is not set in the ACK of E#1.

Then, in $T_4$, the throughput measuring unit 58 measures the throughputs of elephant flows E#0 and E#1 (step t27). Then, in $T_5$, the setRWIN calculating unit 65 calculates the setRWIN (52.5 Kbytes), and the RWIN setting unit 66 sets the setRWIN in the ACKs of E#0 and E#1 and transmits the ACKs (step t28). For the calculation of the setRWIN, 1 Gbps and 0.8 Gbps are used as the throughputs of E#0 and E#1, respectively. Furthermore, although $\alpha=0$ is obtained when the setRWIN is calculated, the setRWIN calculating unit 65 forcibly sets $\alpha=0.1$ to set the setRWIN to a slightly-larger value because plural elephant flows exist.

Figure 21:
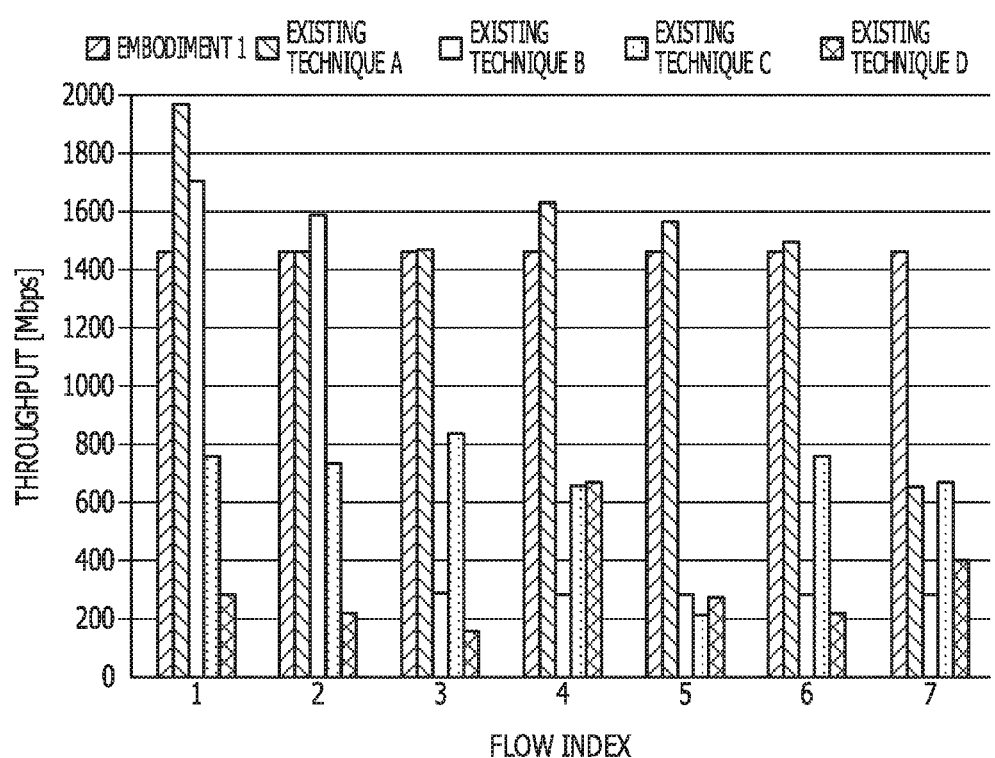
FIG. 21 represents an effect of rate control according to embodiment 1.

FIG. 21 represents an effect of the rate control according to embodiment 1. FIG. 21 represents a result obtained by causing incast in a link of 10 G by use of seven elephant flows of 25.6 Mbytes and fifty mice flows of 256 Kbytes and comparing the throughputs of the respective elephant flows among existing techniques A to D and the rate control according to embodiment 1. For example, the existing technique A is a technique disclosed by the U.S. patent application Ser. No. 14/629,890, the existing technique B is a technique using a dedicated queue for the Elephant, the existing technique C is a technique by the Standard Explicit Congestion Notification (ECN), and the existing technique D is a technique by the Standard Transmission Control Protocol (TCP). The ordinate axis indicates the throughput and the abscissa axis indicates the flow index representing the index of the elephant flow. As illustrated in FIG. 21, in the rate control according to embodiment 1, the throughput is averaged at a large value compared with the existing techniques.

As described above, in embodiment 1, the minimum throughput calculating unit 60 calculates the minimum throughput among the throughputs of plural elephant flows in the congestion avoidance phase. Furthermore, the RWIN calculating unit 62 calculates the RWIN on the basis of the minimum throughput and the RWIN comparing unit 63 calculates the calRWIN. Then, the setRWIN calculating unit 65 calculates the absolute value of the difference between the previous adjustment rate and the present throughput regarding all elephant flows other than the elephant flow having the minimum throughput and calculates α on the basis of the largest value among the absolute values and the previous adjustment rate. Then, the setRWIN calculating unit 65 calculates the setRWIN on the basis of the calRWIN and a and the RWIN setting unit 66 sets the setRWIN in the ACK of each elephant flow. Therefore, the RWIN control unit 5 averages the throughput among competing elephant flows.

Furthermore, in embodiment 1, the RWIN control unit 5 is implemented as part of the virtual switch 9 if the virtual switch 9 exists, and is implemented as part of the OS 8 if the virtual switch 9 does not exist. Therefore, the reception-side end node 3 averages the throughput among competing elephant flows irrespective of whether or not the system is a virtualization system in which the virtual switch 9 exists.

Moreover, in embodiment 1, the RWIN comparing unit 63 compares the RWIN calculated by the RWIN calculating unit 62 and the packet size and employs the larger as the calRWIN. Therefore, the RWIN control unit 5 can set the size of the setRWIN to one packet or larger.

In addition, in embodiment 1, if plural elephant flows exist and $\alpha=0$ is obtained, the setRWIN calculating unit 65 forcibly sets $\alpha=0.1$. Therefore, the RWIN control unit 5 can set the setRWIN larger and the throughput is improved.

In embodiment 1, when the calRWIN is multiplied by α, α is divided by 2. However, in consideration of the state, characteristics, and so forth of the network, α may be not divided by 2 or the square root of a may be used. Alternatively, α may be divided by another natural number or may be divided by a given factor. Furthermore, the calRWIN may be divided by the square root of a instead of multiplying the calRWIN by a.

Embodiment 2

In the above-described embodiment 1, the case of controlling the rate of plural competing elephant flows by one reception-side end node 3 is explained. However, there is also the case in which elephant flows compete among plural reception-side end nodes 3. Therefore, in embodiment 2, rate control when plural elephant flows compete among plural reception-side end nodes 3 will be described.

Figure 22:
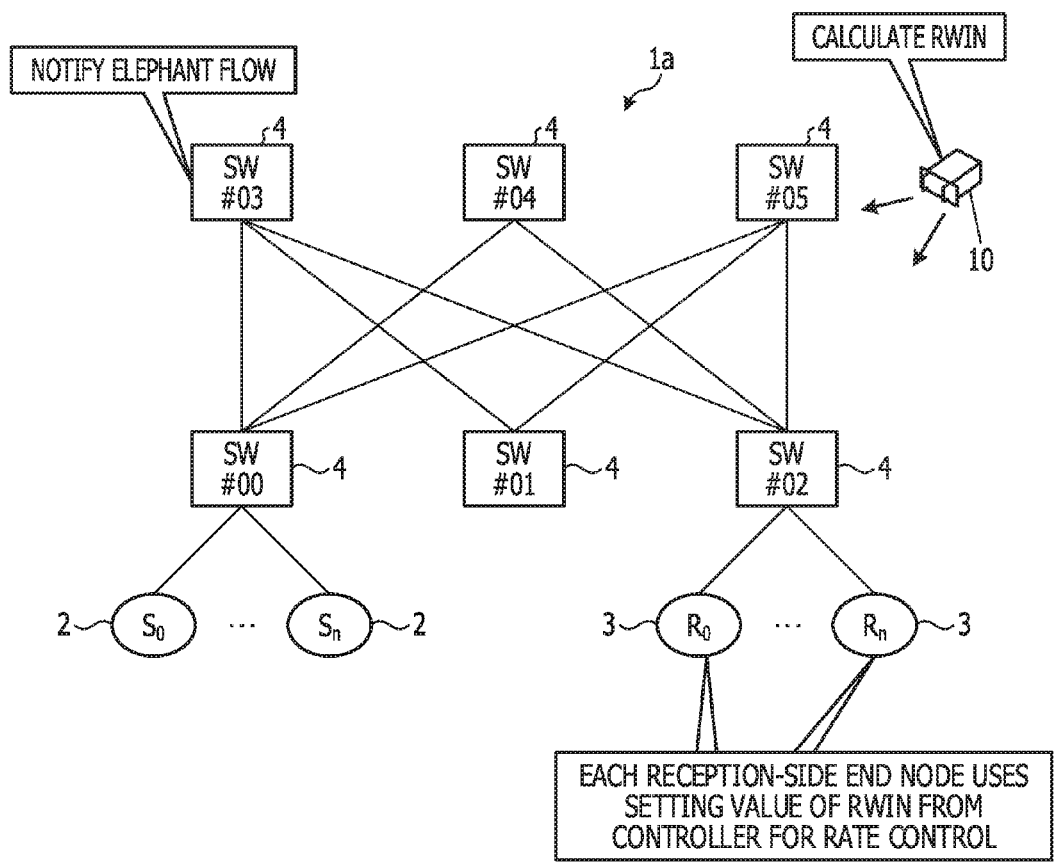
FIG. 22 illustrates a configuration of an information processing system according to embodiment 2.

FIG. 22 illustrates a configuration of an information processing system according to embodiment 2. Here, for convenience of explanation, a device that plays a role similar to the role of the device illustrated in FIG. 1 is given the same symbol and detailed description of the device is omitted. As illustrated in FIG. 22, an information processing system 1a includes n+1 transmission-side end nodes 2, n+1 reception-side end nodes 3, six switch devices 4, and a controller 10.

Figure 23:
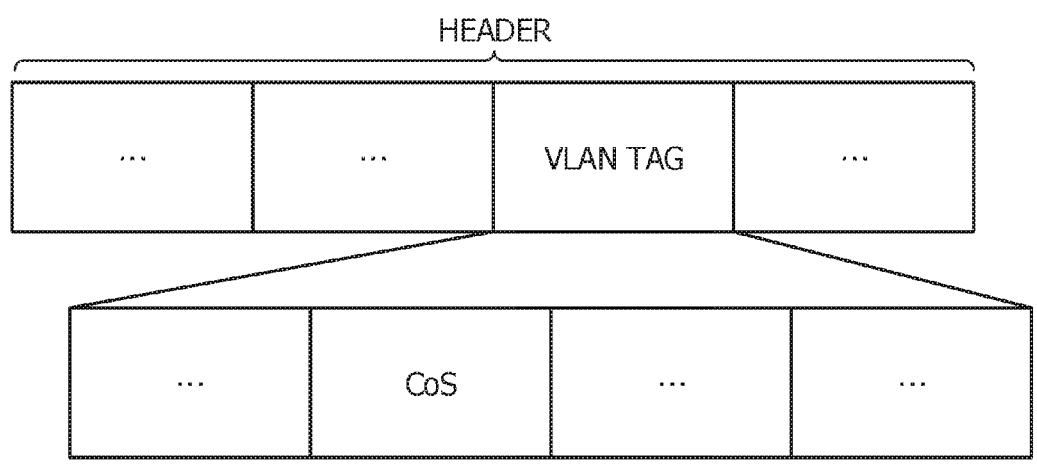
FIG. 23 is a diagram for explaining class of service (CoS)

The spine switches SW#03, SW#04, and SW#05 see the header of a packet. If the packet is a packet of an elephant flow, the spine switches SW#03, SW#04, and SW#05 snoop SYN packet, finish (FIN) packet, and reset (RST) packet and transmit the packet to the controller 10. The spine switches SW#03 to SW#05 determine whether or not the flow is an elephant flow by using DSCP, CoS, and so forth in the header of the packet. FIG. 23 is a diagram for explaining the CoS. As illustrated in FIG. 23, the CoS is included in a virtual local area network (VLAN) tag in the header of the packet.

When calculating the average of the RTT of the elephant flows, each reception-side end node 3 transmits the calculated average RTT to the controller 10.

The controller 10 carries out the rate control of elephant flows that compete among plural reception-side end nodes 3 on the basis of the packets transmitted from the spine switches SW#03 to SW#05 and the average RTT transmitted from each reception-side end node 3. The controller 10 calculates the RWIN and transmits the RWIN to each reception-side end node 3, and each reception-side end node 3 carries out the rate control of the elephant flows by using the RWIN transmitted from the controller 10.

Figure 24:
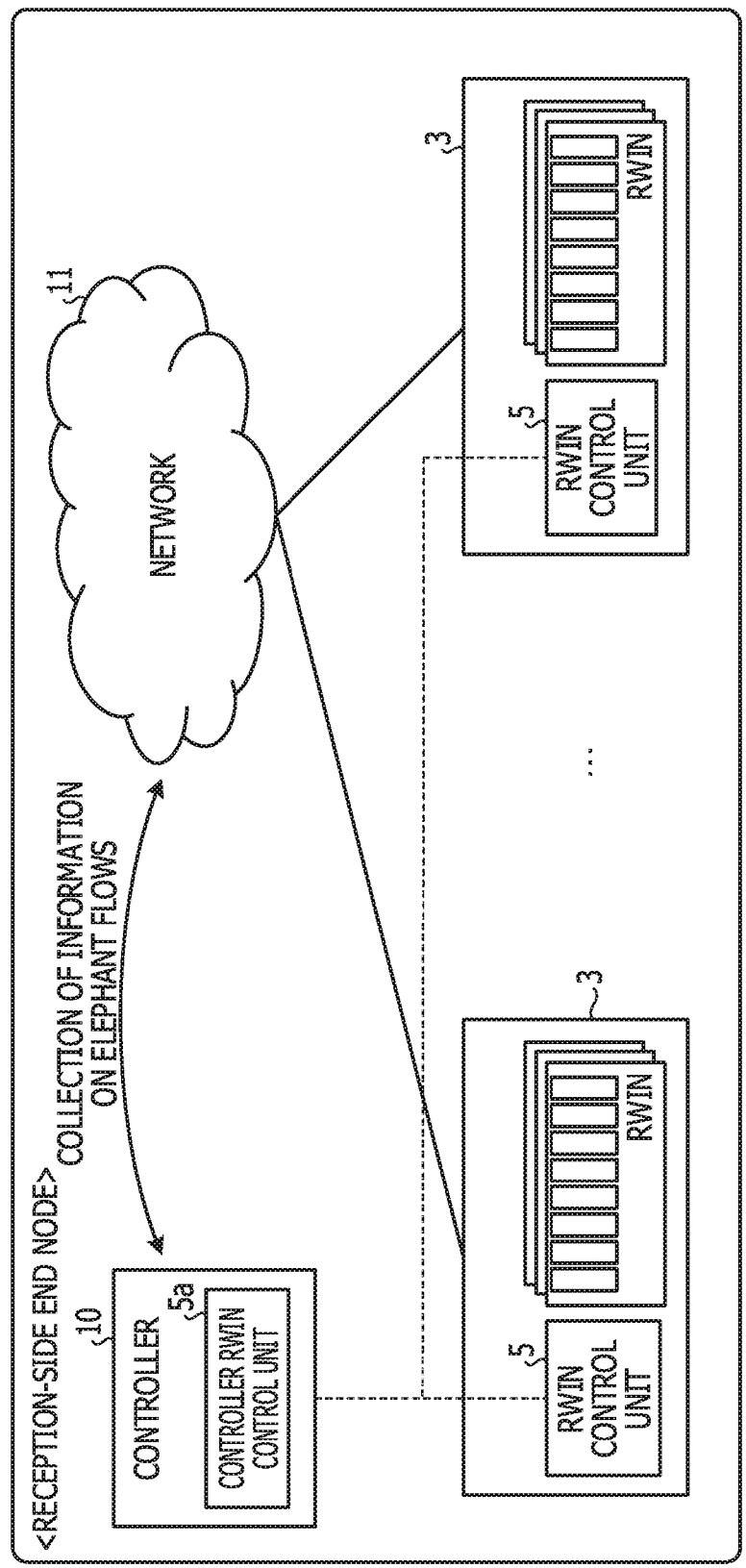
FIG. 24 is a diagram for explaining rate control according to embodiment 2.

FIG. 24 is a diagram for explaining the rate control according to embodiment 2. As illustrated in FIG. 24, the controller 10 includes a controller RWIN control unit 5a. The controller RWIN control unit 5a collects information relating to elephant flows from a network 11 and calculates the RWIN to transmit the calculated RWIN to the RWIN control unit 5 of each reception-side end node 3, and the RWIN control unit 5 carries out the rate control. The RWIN control unit 5 of each reception-side end node 3 carries out the rate control while giving priority to the RWIN received from the controller 10 over the setRWIN calculated by the RWIN control unit 5.

By calculating the RWIN by the controller 10 as above, the information processing system is according to embodiment 2 can equitably carry out the rate control of elephant flows that compete among the reception-side end nodes 3.

Figure 25:
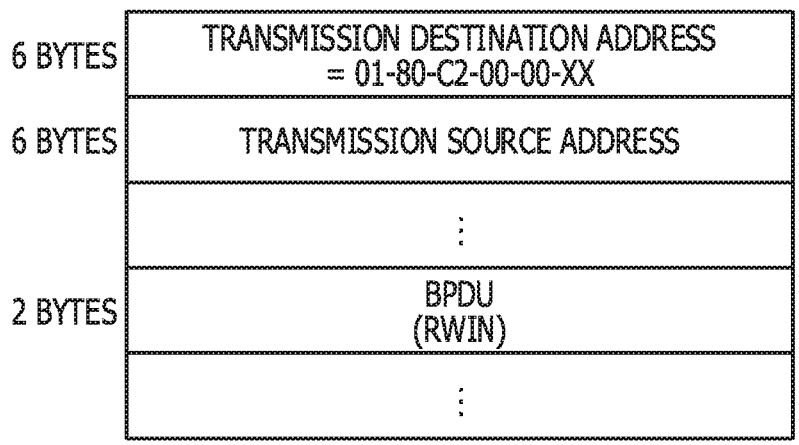
FIG. 25 illustrates a format of a protocol data unit (PDU) for RWIN transmission.

FIG. 25 illustrates a format of a PDU for RWIN transmission. As illustrated in FIG. 25, in the PDU for RWIN transmission, "01-80-C2-00-00-XX" reserved in advance as a transmission destination address is used. Furthermore, the value of the RWIN is set in a BPDU of two bytes represented in FIG. 25.

Figure 26:
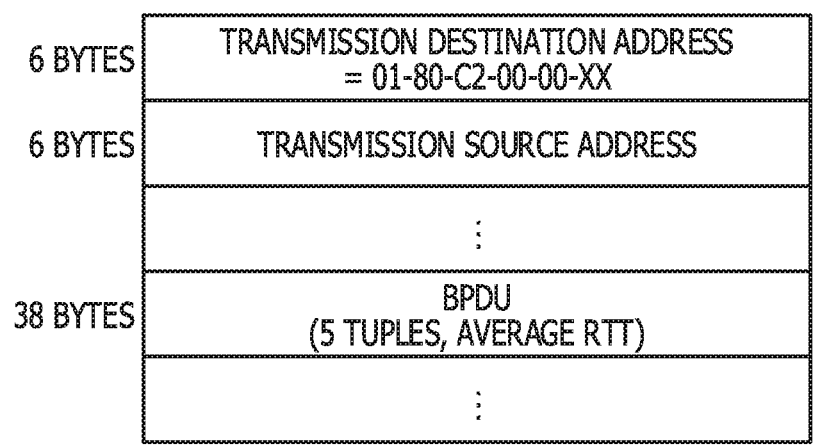
FIG. 26 illustrates a format of a PDU for average RTT transmission.

FIG. 26 illustrates a format of a PDU for average RTT transmission. As illustrated in FIG. 26, in the PDU for average RTT transmission, "01-80-C2-00-00-XX" reserved in advance as a transmission destination address is used. Furthermore, 5 tuples and the average RTT are set in a BPDU of 38 bytes represented in FIG. 26.

Figure 27:
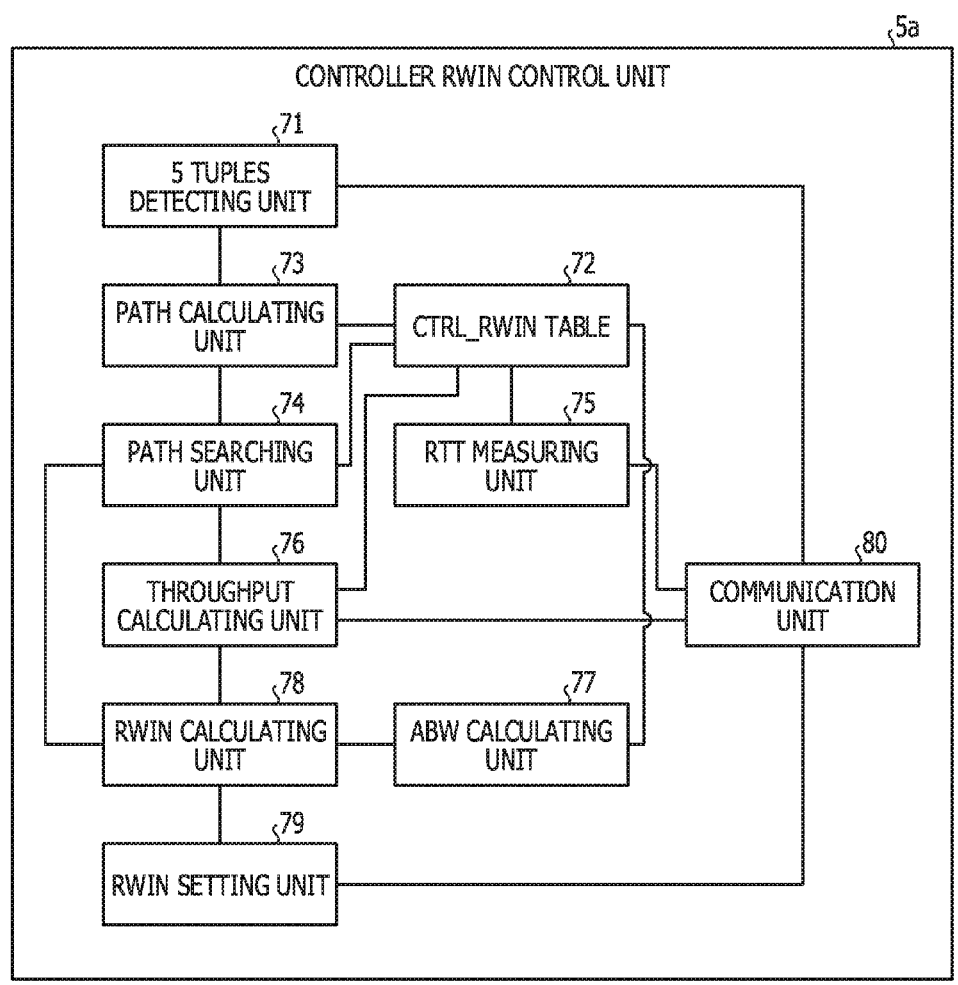
FIG. 27 illustrates a configuration of a controller RWIN control unit.

FIG. 27 illustrates the configuration of the controller RWIN control unit 5a. As illustrated in FIG. 27, the controller RWIN control unit 5a includes a 5 tuples detecting unit 71, a CTRL_RWIN table 72, a path calculating unit 73, a path searching unit 74, an RTT measuring unit 75, a throughput calculating unit 76, and an ABW calculating unit 77. Furthermore, the controller RWIN control unit 5a includes an RWIN calculating unit 78, an RWIN setting unit 79, and a communication unit 80.

The 5 tuples detecting unit 71 extracts 5 tuples from the header of an SYN packet. The CTRL_RWIN table 72 stores information used for calculation of the RWIN. FIG. 28 illustrates one example of items stored by the CTRL_RWIN table 72 about each elephant flow. As illustrated in FIG. 28, the CTRL_RWIN table 72 stores "index," "5 tuples," "path," "RTT," "ABW," "throughput," "RWIN," and "topology" about each elephant flow.

"Index" is an identifier to identify an elephant flow. "5 tuples" is 5 tuples for identifying the elephant flow. "Path" is the path from end to end through which the elephant flow passes. "RTT" is the average RTT between ACK and data.

Figure 29:
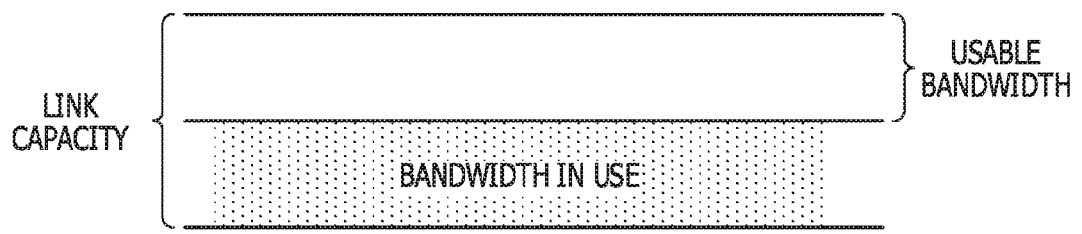
FIG. 29 is a diagram for explaining usable bandwidth.

"ABW" is the minimum usable bandwidth on the path. FIG. 29 is a diagram for explaining the usable bandwidth. As illustrated in FIG. 29, the usable bandwidth is the bandwidth obtained by subtracting the bandwidth in use from the link capacity. For example, when the link capacity is 10 Gbps and the bandwidth in use is 5 Gbps, the usable bandwidth is 5 Gbps.

"Throughput" is the throughput of the elephant flow. "RWIN" is the RWIN calculated on the basis of the ABW and the throughput. "Topology" indicates the presence and absence of links between switch devices and is defined by a matrix. FIG. 30 illustrates one example of the matrix. As illustrated in FIG. 30, if a link exists between switch devices, the corresponding element in the matrix is "○." If a link does not exist between switch devices, the corresponding element in the matrix is "-."

Referring back to FIG. 27, the path calculating unit 73 calculates the path of the elephant flow from end to end by using network information such as the 5 tuples and the matrix and records the path in the CTRL_RWIN table 72. The path searching unit 74 searches the CTRL_RWIN table 72 and determines whether the number of elephant flows is two or more in the same link.

The RTT measuring unit 75 receives the average RTT transmitted by the reception-side end node 3 from the communication unit 80 and records the average RTT in the CTRL_RWIN table 72. The throughput calculating unit 76 calculates the throughput of each elephant flow from the average RTT and the number of flows.

The ABW calculating unit 77 calculates the usable bandwidth of each link from the number of links and the link capacity and records the minimum value ABW of the calculated usable bandwidth in the CTRL_RWIN table 72. For example, the ABW calculating unit 77 calculates the ABW by the following expression (2).

$$ABW = MIN_{I=0,L}\{Linkcap(1) - Linkused(1)\} \qquad (2)$$

In expression (2), Linkcap is the link capacity and Linkused is the bandwidth in use.

The RWIN calculating unit 78 calculates the RWIN on the basis of the ABW, the throughput of each elephant flow, and the average of the average RTTs received from the plural reception-side end nodes 3. For example, the RWIN calculating unit 78 calculates the RWIN by the following expression (3).

$$RWIN=\{(ABW+\Sigma_{i=0}^{1}BW(f_i))Avg(RTT)\}/n \quad (3)$$

In expression (3), $BW(f_i)$ is the bandwidth used by the elephant flow i (throughput) and Avg(RTT) is the average of the average RTTs received from the plural reception-side end nodes 3.

The RWIN setting unit 79 transmits the RWIN calculated by the RWIN calculating unit 78 to the reception-side end nodes 3 at which the competition is occurring via the communication unit 80. The communication unit 80 carries out communications such as reception of the average RTTs transmitted from the reception-side end nodes 3, transmission of the RWIN to the reception-side end nodes 3, and reception of the packet from the switch device 4.

Figure 31:
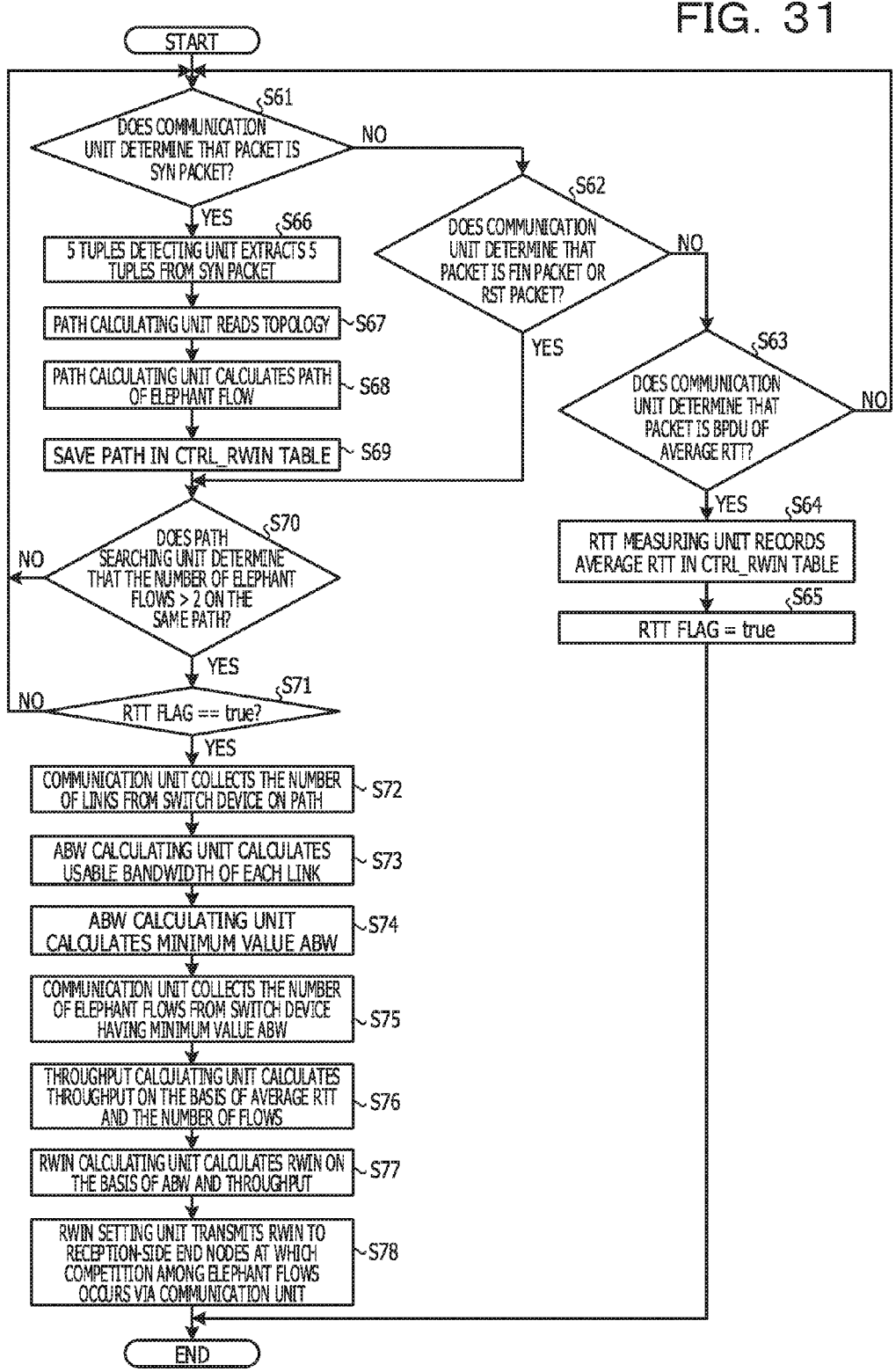
FIG. 31 is a flowchart illustrating a flow of processing by a controller.

Next, the flow of processing by the controller 10 will be described. FIG. 31 is a flowchart illustrating the flow of the processing by the controller 10. As illustrated in FIG. 31, the communication unit 80 receives a packet and determines whether or not the received packet is an SYN packet (step S61).

If the received packet is not an SYN packet as the result of the determination, the communication unit 80 determines whether or not the packet is an FIN packet or an RST packet (step S62). If the received packet is neither an FIN packet nor an RST packet as the result of the determination, the communication unit 80 determines whether the packet is a BPDU of the average RTT (step S63). If the received packet is not a BPDU of the average RTT as the result of the determination, the controller 10 returns to the step S61.

On the other hand, if the received packet is a BPDU of the average RTT, the RTT measuring unit 75 records the average RTT in the CTRL_RWIN table 72 (step S64) and sets the RTT flag to "true" (step S65). Furthermore, if the received packet is an FIN packet or an RST packet in the step S62, the controller 10 proceeds to a step S70.

Furthermore, if the received packet is an SYN packet in the step S61, the 5 tuples detecting unit 71 extracts 5 tuples from the SYN packet (step S66). Then, the path calculating unit 73 reads the topology (step S67) and calculates the path of the elephant flow (step S68) to save the path in the CTRL_RWIN table 72 (step S69).

Then, the path searching unit 74 searches the CTRL_RWIN table 72 and determines whether or not the number of elephant flows is larger than 2 on the same path (step S70). If the number of elephant flows is not larger than 2, the controller 10 returns to the step S61. On the other hand, if the number of elephant flows is larger than 2, the controller 10 determines whether or not the RTT flag is "true" (step S71). If the RTT flag is not "true," the controller 10 returns to the step S61 because the average RTT has not been received from the reception-side end node 3.

On the other hand, if the RTT flag is "true," the communication unit 80 collects the number of links from the switch device 4 on the path (step S72). Then, the ABW calculating unit 77 calculates the usable bandwidth of each link (step S73) and calculates the minimum value ABW of the usable bandwidth (step S74).

Then, the communication unit 80 collects the number of elephant flows from the switch device 4 having the minimum value ABW (step S75). Then, the throughput calculating unit 76 calculates the throughput on the basis of the Avg(RTT) and the number of elephant flows (step S76). Then, the RWIN calculating unit 78 calculates the RWIN on the basis of the ABW and the throughput (step S77). Then, the RWIN setting unit 79 transmits the RWIN to the reception-side end nodes 3 at which competition among elephant flows occurs via the communication unit 80 (step S78).

In this manner, the controller 10 calculates the RWIN and transmits the calculated RWIN to the reception-side end nodes 3 and thereby the throughput is equalized among the reception-side end nodes 3 at which elephant flows compete.

Figure 32:
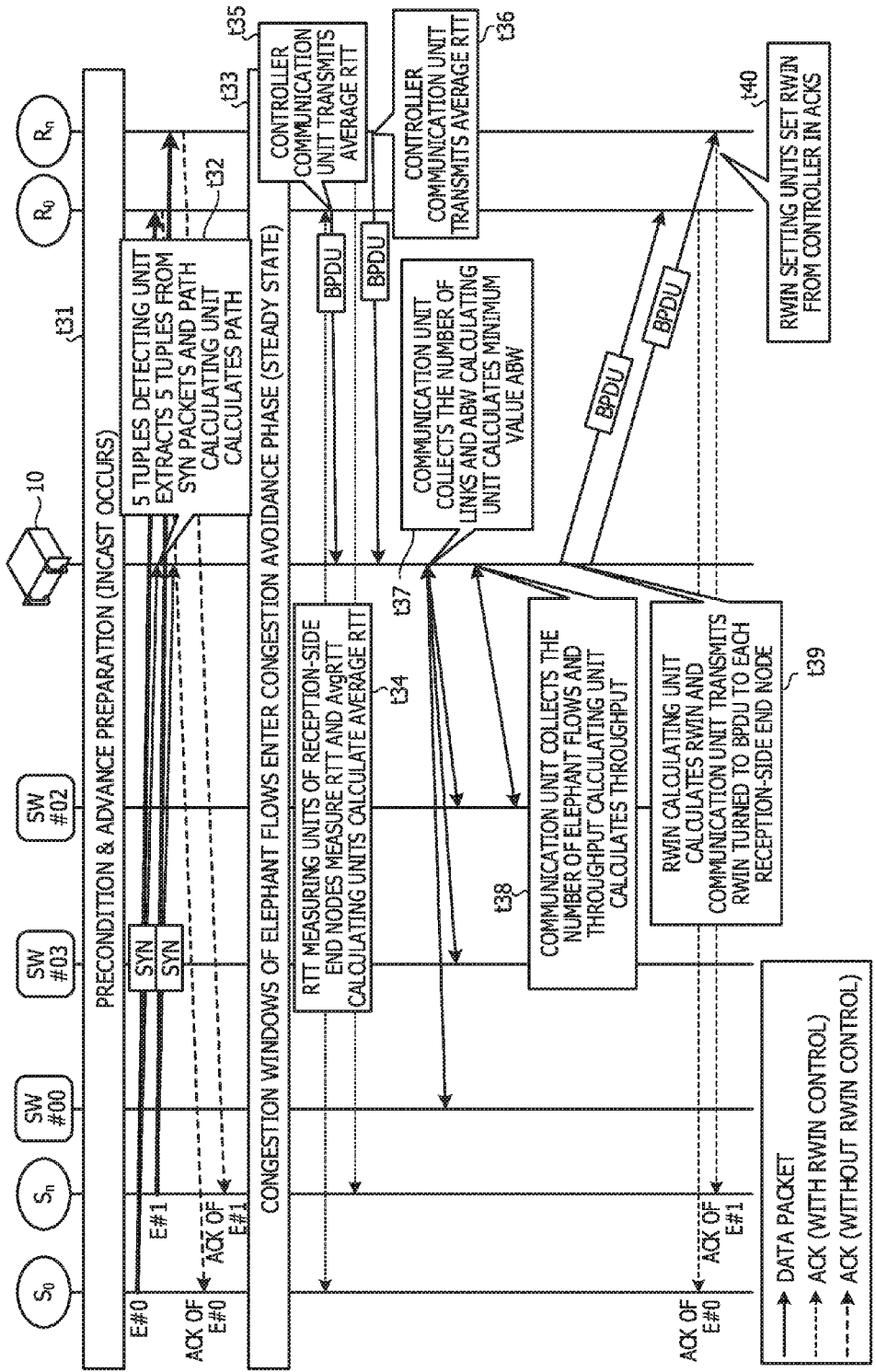
FIG. 32 illustrates a sequence of rate control.

Next, the sequence of the rate control will be described. FIG. 32 illustrates the sequence of the rate control. As illustrated in FIG. 32, first the precondition and the advance preparation are completed (step t31). That is, incast occurs.

Then, $S_0$ transmits an SYN packet of elephant flow E#0 to $R_0$, and $S_n$ transmits an SYN packet of elephant flow E#1 to $R_n$. Furthermore, the 5 tuples detecting unit 71 of the controller 10 extracts 5 tuples from the SYN packets and the path calculating unit 73 calculates the path (step t32). In addition, $R_0$ transmits an ACK of elephant flow E#0 to $S_0$, and $R_n$ transmits an ACK of elephant flow E#1 to $S_n$.

Then, the congestion windows of the elephant flows enter the congestion avoidance phase (step t33). Then, the RTT measuring units 54 of the reception-side end nodes 3 measure the RTT and the AvgRTT calculating units 56 calculate the average RTT (step t34). Then, the controller communication unit 68 of $R_0$ turns the average RTT to a BPDU and transmits the BPDU (step t35) and the controller communication unit 68 of $R_n$ turns the average RTT to a BPDU and transmits the BPDU (step t36).

Then, the communication unit 80 of the controller 10 collects the number of links and the ABW calculating unit 77 calculates the minimum value ABW (step t37). Furthermore, the communication unit 80 of the controller 10 collects the number of elephant flows and the throughput calculating unit 76 calculates the throughput (step t38). Then, the RWIN calculating unit 78 of the controller 10 calculates the RWIN and the communication unit 80 transmits the RWIN turned to a BPDU to each reception-side end node 3 (step t39).

Then, the RWIN setting units 66 of the respective reception-side end nodes 3 set the RWIN from the controller 10 in ACKs (step t40). Then, $R_0$ transmits the ACK of elephant flow E#0 to $S_0$, and $R_n$ transmits the ACK of elephant flow E#1 to $S_n$.

As described above, in embodiment 2, the throughput calculating unit 76 calculates the throughput of each elephant flow and the ABW calculating unit 77 calculates the minimum value ABW of the usable bandwidth. Then, the RWIN calculating unit 78 calculates the RWIN by using the usable bandwidth of each elephant flow calculated from the throughput, the ABW, and the Avg(RTT), and the RWIN setting unit 79 transmits the RWIN to each reception-side end node 3. Then, the RWIN setting unit 66 of each reception-side end node 3 sets the RWIN from the controller 10 in the ACK. Therefore, the controller RWIN control unit 5a suppresses the occurrence of competition among elephant flows among the reception-side end nodes 3, so that the elephant flows are efficiently processed in the information processing system 1a.

In embodiments 1 and 2, the RWIN control unit 5 and the controller RWIN control unit 5a are described. By implementing the RWIN control unit 5 and the controller RWIN control unit 5a as a software, an RWIN control program can be achieved. Therefore, a computer that executes the RWIN control program will be described.

Figure 33:
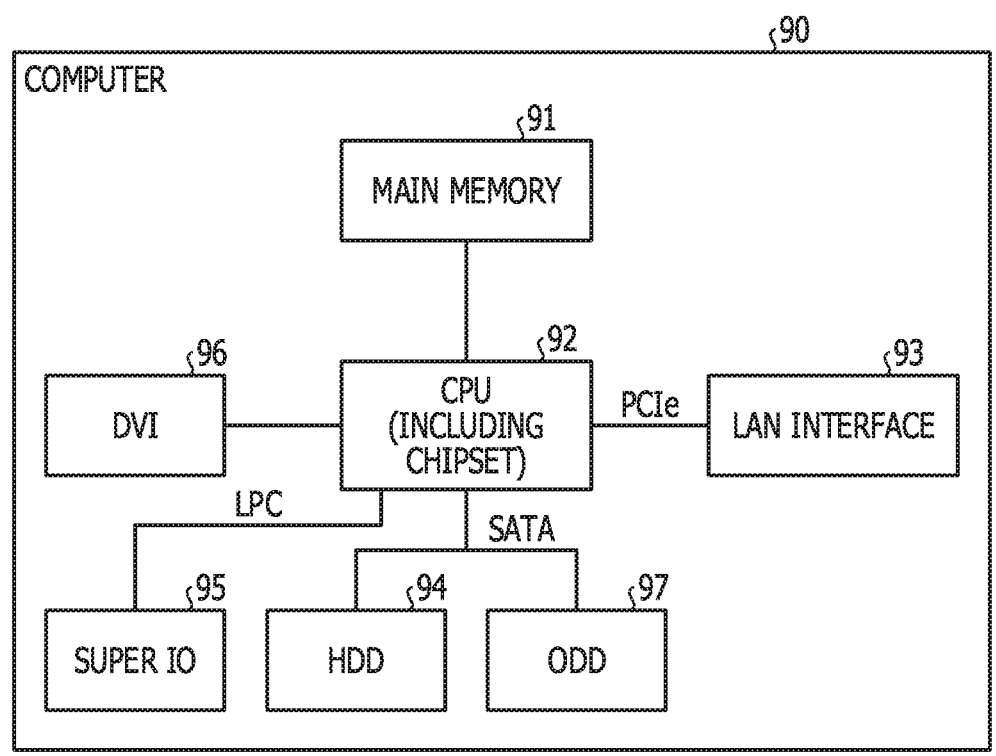
FIG. 33 illustrates a configuration of a computer that executes an RWIN control program according to embodiments 1 and 2.

FIG. 33 illustrates a configuration of a computer that executes the RWIN control program according to embodiments 1 and 2. As illustrated in FIG. 33, a computer 90 includes a main memory 91, a central processing unit (CPU) 92, a local area network (LAN) interface 93, and a hard disk drive (HDD) 94. Furthermore, the computer 90 includes a super input output (IO) 95, a digital visual interface (DVI) 96, and an optical disk drive (ODD) 97.

The main memory 91 is a memory that stores programs, intermediate results of execution of a program, and so forth. The CPU 92 is a central processing device that reads out a program from the main memory 91 and executes the program. The CPU 92 includes a chipset including a memory controller.

The LAN interface 93 is an interface for coupling the computer 90 to another computer via a LAN. The HDD 94 is a disk device that stores programs and data and the super JO 95 is an interface for coupling input devices such as a mouse and a keyboard. The DVI 96 is an interface that couples a liquid crystal display device and the ODD 97 is a device that carries out reading and writing of a digital versatile disk (DVD).

The LAN interface 93 is coupled to the CPU 92 by the peripheral component interconnect express (PCIe), and the HDD 94 and the ODD 97 are coupled to the CPU 92 by the serial advanced technology attachment (SATA). The super IO 95 is coupled to the CPU 92 by the low pin count (LPC).

Furthermore, the RWIN control program executed in the computer 90 is stored in a DVD and is read out from the DVD by the ODD 97 to be installed on the computer 90. Alternatively, the RWIN control program is stored in a database or the like of another computer system coupled via the LAN interface 93 and is read out from the database to be installed on the computer 90. Then, the installed RWIN control program is stored in the HDD 94 and is read out into the main memory 91 to be executed by the CPU 92.

In embodiments 1 and 2, the case in which incast is occurring is described. However, embodiments are not limited thereto and can be similarly applied also to competition among elephant flows in the case in which incast is not occurring.

Furthermore, in embodiments 1 and 2, the case in which competition is occurring among elephant flows is described. However, embodiments are not limited thereto and can be similarly applied also to the case in which competition is occurring among flows of another kind, such as mice flows, for example.

Moreover, in embodiments 1 and 2, the case is described in which a network is formed with spine switches and leaf switches and end nodes are coupled under the leaf switches. However, embodiments are not limited thereto and can be similarly applied also to a network including another configuration, such as the case in which top-of-rack (TOR) switches are coupled under leaf switches and end nodes are coupled to the TOR switches, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
a transmitting device;
a plurality of switch devices;
a plurality of receiving devices configured to receive a packet transmitted from the transmitting device via the plurality of switch devices, each of the plurality of receiving devices including a first processor; and
a control device configured to control the transmitting device and the plurality of receiving devices and include a second processor,
wherein
the first processor of each of the plurality of receiving devices carries out a process including
monitoring an increase in size of a congestion window which the transmitting device includes,
measuring a round trip time, the round trip time being a time from transmission of a response packet to the transmitting device in response to reception of data from the transmitting device to reception of next data transmitted by the transmitting device due to reception of the response packet,
calculating a minimum throughput in one or more target flows whose volume is not smaller than a given size among flows whose packets are received when the increase in the size of the congestion window becomes a steady state,
creating a setting window size that is a receive window size for setting on a basis of an already-set window size that is a size of a receive window set in a past response packet and a calculated window size that is a size of a receive window calculated from the minimum throughput, and
transmitting a response packet in which the setting window size is set to the transmitting device, and
the second processor is configured to:
calculate a control setting window size that is a receive window size for setting by the control device on a basis of an average round trip time of each of the plurality of receiving devices calculated from one or more round trip times measured in each of the plurality of receiving devices and a minimum value of a usable bandwidth of a link through which the one or more target flows pass, and
transmit a control packet in which the control setting window size is set to each of the plurality of receiving devices, wherein
the second processor is configured to:
calculate, as the control setting window size, a value obtained by multiplying a value resulting from addition of a sum of bandwidths used by the one or more target flows in the link in which the usable bandwidth is the minimum value to the minimum value by the average round trip time and dividing a product of the multiplication by the number of the one or more target flows.

2. The system according to claim 1, wherein the creating creates the setting window size on a basis of a ratio between a value calculated from throughputs of the one or more target flows and the already-set window size and the already-set window size.

3. The system according to claim 2, wherein the creating sets the ratio to a number between 0 and 1 when the one or more target flows are a plurality of flows and the ratio is 0.

4. The system according to claim 1, wherein the plurality of switch devices include:
a first switch device coupled to the transmitting device, a second switch device coupled to the receiving device,
a third switch device coupled to the first switch device and the second switch device, and
a fourth switch device coupled to the first switch device and the second switch device.

5. The system according to claim 1, wherein the process is carried out by a virtual switch when the transmitting device and the receiving devices communicate by using the virtual switch.

6. The system according to claim 1, wherein the creating sets the larger of the minimum throughput and size of the packet as the calculated window size.

7. A method executed in a system including a transmitting device, a plurality of switch devices, a plurality of receiving devices configured to receive a packet transmitted from the transmitting device via the plurality of switch devices, and a control device configured to control the transmitting device and the plurality of receiving devices, the method comprising:
   monitoring, by each of the plurality of receiving devices, an increase in size of a congestion window which the transmitting device includes;
   measuring, by each of the plurality of receiving devices, a round trip time, the round trip time being a time from transmission of a response packet to the transmitting device in response to reception of data from the transmitting device to reception of next data transmitted by the transmitting device due to reception of the response packet;
   calculating, by each of the plurality of receiving devices, a minimum throughput in one or more target flows whose volume is not smaller than a given size among flows whose packets are received when the increase in the size of the congestion window becomes a steady state;
   creating, by each of the plurality of receiving devices, a setting window size that is a receive window size for setting on a basis of an already-set window size that is size of a receive window set in a past response packet and a calculated window size that is size of a receive window calculated from the minimum throughput;
   transmitting, by each of the plurality of receiving devices, a response packet in which the setting window size is set to the transmitting device;
   calculating, by the control device, a control setting window size that is a receive window size for setting by the control device on a basis of an average round trip time of each of the plurality of receiving devices calculated from one or more round trip times measured in each of the plurality of receiving devices and a minimum value of a usable bandwidth of a link through which the one or more target flows pass; and
   transmitting, by the control device, a control packet in which the control setting window size is set to each of the plurality of receiving devices, wherein
   in the calculating of the control setting window size, calculating, as the control setting window size, a value obtained by multiplying a value resulting from addition of a sum of bandwidths used by the one or more target flows in the link in which the usable bandwidth is the minimum value to the minimum value by the average round trip time and dividing a product of the multiplication by the number of the one or more target flows.

8. The method according to claim 7, wherein the creating creates the setting window size on a basis of a ratio between a value calculated from throughputs of the one or more target flows and the already-set window size and the already-set window size.

9. The method according to claim 8, wherein the creating sets the ratio to a number between 0 and 1 when the one or more target flows are a plurality of flows and the ratio is 0.

10. The method according to claim 7, wherein the plurality of switch devices include:
   a first switch device coupled to the transmitting device,
   a second switch device coupled to the receiving device,
   a third switch device coupled to the first switch device and the second switch device, and
   a fourth switch device coupled to the first switch device and the second switch device.

11. The method according to claim 7, wherein the method is carried out by a virtual switch when the transmitting device and the receiving devices communicate by using the virtual switch.

12. The method according to claim 7, wherein the creating sets the larger of the minimum throughput and size of the packet as the calculated window size.

13. A receiving device comprising:
   a memory; and
   a processor coupled to the memory and configured to:
      monitor an increase in size of a congestion window which a transmitting device in a system includes, the system including a plurality of switch devices, one or more receiving devices being configured to receive a packet transmitted from the transmitting device via the plurality of switch devices, a control device being configured to control the transmitting device and a plurality of receiving devices including the receiving device and the one or more receiving devices,
      measure a round trip time, the round trip time being a time from transmission of a response packet to the transmitting device in response to reception of data from the transmitting device to reception of next data transmitted by the transmitting device due to reception of the response packet,
      calculate a minimum throughput in one or more target flows whose volume is not smaller than a given size among flows whose packets are received when the increase in the size of the congestion window becomes a steady state,
      create a setting window size that is a receive window size for setting on a basis of an already-set window size that is a size of a receive window set in a past response packet and a calculated window size that is a size of a receive window calculated from the minimum throughput, and
      transmit a response packet in which the setting window size is set to the transmitting device, and
   wherein the control device is configured to:
      calculate a control setting window size that is a receive window size for setting by the control device on a basis of an average round trip time of each of the plurality of receiving devices calculated from one or more round trip times measured in each of the plurality of receiving devices and a minimum value of a usable bandwidth of a link through which the one or more target flows pass, and
      transmit a control packet in which the control setting window size is set to each of the plurality of receiving devices, wherein
   the control device is configured to:

calculate, as the control setting window size, a value obtained by multiplying a value resulting from addition of a sum of bandwidths used by the one or more target flows in the link in which the usable bandwidth is the minimum value to the minimum value by the average round trip time and dividing a product of the multiplication by the number of the one or more target flows.

14. The receiving device according to claim 13, wherein the processor is configured to create the setting window size on a basis of a ratio between a value calculated from throughputs of the one or more target flows and the already-set window size and the already-set window size.

15. The receiving device according to claim 14, wherein the processor is configured to set the ratio to a number between 0 and 1 when the one or more target flows are a plurality of flows and the ratio is 0.

16. The receiving device according to claim 13, wherein the processor is configured to set the larger of the minimum throughput and size of the packet as the calculated window size.

* * * * *